US012345890B2

(12) United States Patent
Ide

(10) Patent No.: US 12,345,890 B2
(45) Date of Patent: Jul. 1, 2025

(54) VIRTUAL IMAGE DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 489 days.

(21) Appl. No.: 17/876,762

(22) Filed: Jul. 29, 2022

(65) Prior Publication Data

US 2023/0030353 A1 Feb. 2, 2023

(30) Foreign Application Priority Data

Jul. 30, 2021 (JP) .................. 2021-125111

(51) Int. Cl.
*G02B 27/14* (2006.01)
*G02B 5/00* (2006.01)
*G02B 5/30* (2006.01)
*G02B 17/06* (2006.01)
*G02B 27/01* (2006.01)

(52) U.S. Cl.
CPC ......... *G02B 27/0172* (2013.01); *G02B 5/005* (2013.01); *G02B 5/30* (2013.01); *G02B 17/0642* (2013.01)

(58) Field of Classification Search
CPC ...... G02B 5/005; G02B 5/30; G02B 17/0642; G02B 27/0172
USPC ......................................... 359/485
See application file for complete search history.

(56) References Cited

U.S. PATENT DOCUMENTS

2003/0063400 A1 4/2003 Sunaga et al.

FOREIGN PATENT DOCUMENTS

JP 2003-005074 A 1/2003

*Primary Examiner* — Bumsuk Won
*Assistant Examiner* — Grant A Gagnon
(74) *Attorney, Agent, or Firm* — Oliff PLC

(57) ABSTRACT

A virtual image display device includes a display element, which is an image light generating unit that generates an image light, a first mirror that reflects the image light, a second mirror that reflects the image light reflected by the first mirror, and a third mirror that transmits external light and that reflects part of the image light reflected by the second mirror to guide the image light to a position of an exit pupil, wherein the first mirror has an angular dependence on a reflective surface.

15 Claims, 17 Drawing Sheets

VIRTUAL IMAGE DISPLAY DEVICE

The present application is based on, and claims priority from JP Application Serial Number 2021-125111, filed Jul. 30, 2021, the disclosure of which is hereby incorporated by reference herein in its entirety.

BACKGROUND

1. Technical Field

The present disclosure relates to a virtual image display device that allows observation of a virtual image formed by an image light generating unit, etc.

2. Related Art

As a reflective optical element, there is known an optical element which has three or more reflective surfaces to guide a light flux and can be used as an observation optical system of a head-mounted display (HMD) (JP-A-2003-5074).

However, regarding the configuration having a plurality of reflection surfaces (R4, R3, R2) illustrated in the above technology, for example, when a portion (for example, a R2, etc.) of the plurality of reflection surfaces is provided with transmissive properties and is applied to what is visible through so-called see-through, which makes external light visible along with image light, there is a possibility that the external light is reflected in an unintended direction by a portion (for example, R4) of the reflective surfaces and enters the eyes of the user (wearer) as ghost light, etc.

SUMMARY

A virtual image display device according to one aspect of the present disclosure includes an image light generating unit that generates an image light, a first mirror that reflects the image light, a second mirror that reflects the image light reflected by the first mirror, and a third mirror that transmits an external light and that reflects, toward a position of an exit pupil, part of the image light reflected by the second mirror, wherein the first mirror has an angular dependence such that a reflectance varies depending on an angle of incidence of the image light.

DESCRIPTION OF EXEMPLARY EMBODIMENTS

First Embodiment

Hereinafter, an example of the structure, operation, etc. of a virtual image display device according to the present disclosure will be described with reference to FIG. 1 etc.

Figure 1:
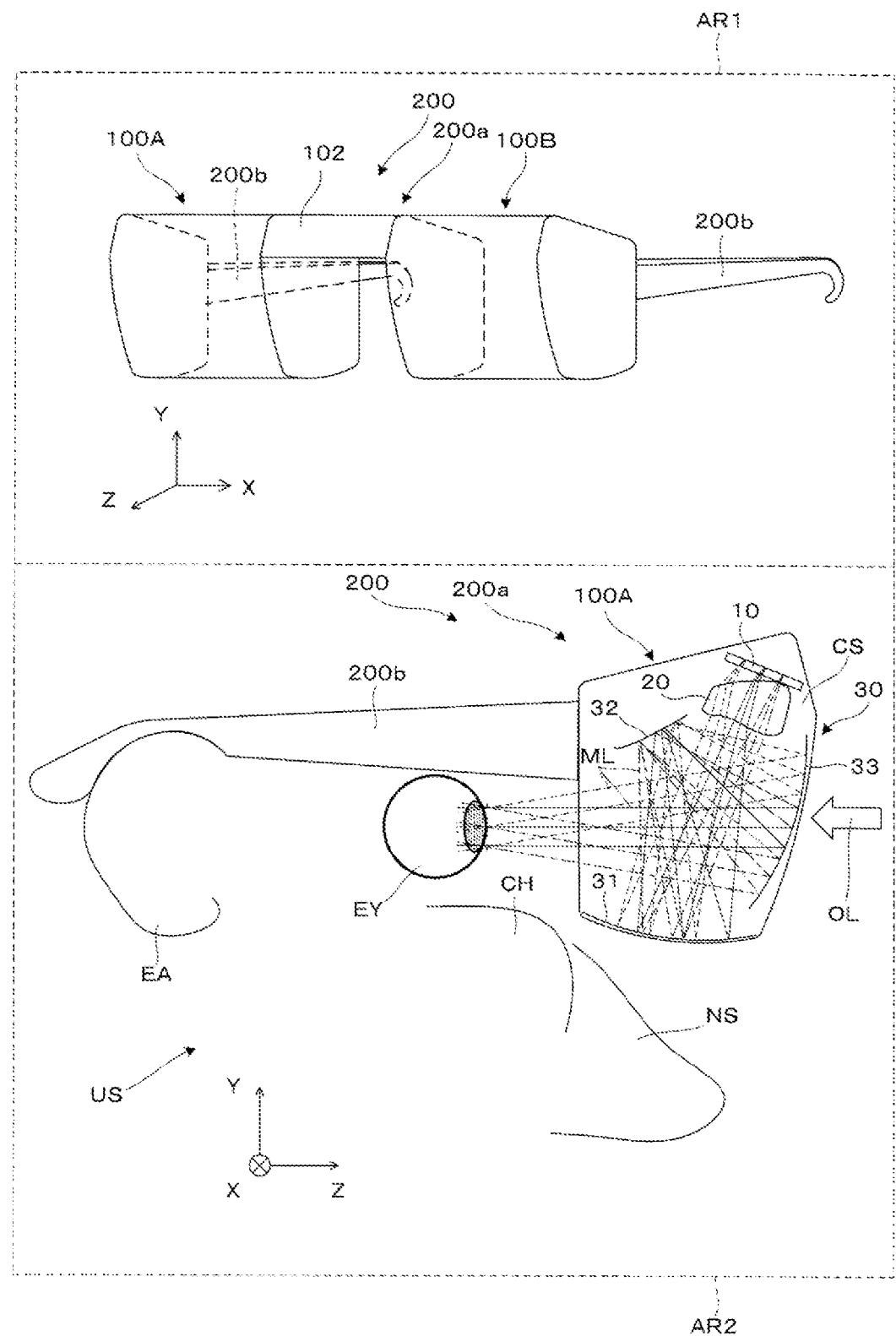
FIG. 1 is a conceptual diagram schematically illustrating a virtual image display device according to a first exemplary embodiment.

FIG. 1 is a diagram conceptually illustrating the virtual image display device 200, in which a perspective view schematically illustrating an external appearance of the virtual image display device 200 is illustrated in a first region AR1, and an internal structure related to an optical system is schematically illustrated in a second region AR2.

The virtual image display device 200 is a head-mounted display (hereinafter, also referred to as an HMD), and is an image display device that causes an observer or wearer US who is a user wearing the HMD to recognize video as a virtual image. In FIG. 1, etc., X, Y, and Z are an orthogonal coordinate system, a +X direction corresponds to a transverse direction in which the two eyes EY of an observer or wearer US who is wearing the virtual image display device (or HMD) 200 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction. In the following description, an upward direction, a downward direction, or an upper side and a lower side mean a +Y direction and a −Y direction.

The virtual image display device 200 includes a main body 200a disposed so as to cover the front of the wearer US, and a pair of support members 200b having a shape of temples that support the main body 200a. The main body 200a includes a first display device 100A for a right eye, a second display device 100B for a left eye, and a bridge portion 102 provided between the first display device 100A and the second display device 100B and coupled thereto. Further, although detailed illustration is omitted, for example, a nose pad (nose rest portion), etc. is provided at the main body 200a, and the virtual image display device 200 has an eyeglasses-like shape as a whole, and can be removed as a whole.

Note that in the second region AR2, the first display device 100A is illustrated as a representative of the left-right symmetric first display device 100A and the second display device 100B constituting the virtual image display device 200. Since the second display device 100B for the left eye has the same structure as that of the first display device 100A, detailed description thereof is omitted.

As illustrated in the drawing, the first display device 100A includes, as portions having optical functions, a display element 10, which is an image light generating unit that emits image light ML, a prism 20 that is an optical member on which the image light ML from the display element 10 is incident, and a reflective optical element 30 that is configured by three reflection members (a first mirror 31, a second mirror 32, and a third mirror 33) that reflect the image light ML from the prism 20. These members are accommodated in a housing CS and fixed in place. Note that the housing CS can be constituted of various shapes and materials within a range that does not affect the optical function of the first display device 100A.

The virtual image display device 200 is supported by an ear EA, a nose NS, etc. of the wearer US, and when the image light ML emitted from the display element 10 of the first display device 100A reaches the eye EY, an image as a virtual image is visually recognized. Also, external light OL is also visually recognized beyond the third mirror 33 of the first display device 100A. That is, in this case, the third mirror 33 functions as a half mirror that reflects part of the image light ML and transmits part of the external light OL.

Hereinafter, an outline of an optical path of the image light ML (light guide of the image light ML) in the virtual image display device 200 will be described with reference to a conceptual side cross-sectional view illustrated as FIG. 2. Note that in FIG. 2, a central light flux (central component CL) of the image light ML emitted from the display element 10 is illustrated. In other words, here, the optical path is traced for the component of the image light ML that is emitted from the center of the display element 10 (center point CO of a light emission surface 10a of the display element 10).

First, the image light ML is projected in a direction having a component in the downward direction (−Y direction), and enters and refracts from the incident portion 21 of the prism 20, and is emitted by further refraction in the emitting portion 22. The image light ML having passed through the prism 20 is first reflected by the first mirror 31 located at the lowest position among the first mirror 31, the second mirror 32, and the third mirror 33 which are three reflection members located below the prism 20 and constituting the reflective optical element 30, and travels toward the second mirror 32 located in a direction having a component in the upward direction (+Y direction). That is, the first mirror 31 is located below the prism 20 and the second mirror 32 when mounted, and reflects the image light ML projected downward from the prism 20 upward.

The image light ML having passed through the first mirror 31 is reflected by the second mirror 32 and is again directed downward, and then is incident on the third mirror 33. The third mirror 33 bends the image light ML from the second mirror 32 parallel to an exit pupil PP that is to be a position of the eye EY of the wearer US.

Further, in the above description, as illustrated in the drawing, the optical path of the image light ML from the prism 20 to the first mirror 31 intersects with the optical path of the image light ML from the second mirror 32 to the third mirror 33, and intersects with the optical path of the image light ML from the third mirror 33 toward the position of the exit pupil PP. That is, in the reflective optical element 30, the optical path of the image light ML is bent so as to intersect over a plurality of times, and thus, the entire optical system is miniaturized while having a certain optical path length.

In addition, as described above, as another optical aspect, the prism 20 and the first mirror 31 which are optical members collectively function as a convex lens. Further, in the illustrated example, an intermediate image IM is formed between the second mirror 32 and the third mirror 33.

Also, the third mirror 33 has semi-transmissive properties, and transmits part of the external light OL from the outside. On the other hand, as described above, the third mirror 33 functions as a half mirror that turns back (bends) the part of the image light ML reflected by the second mirror 32 toward the position of the exit pupil PP and transmits another part of the image light ML. That is, in the virtual image display device 200, a see-through type optical system is configured in which the image light ML and the external light OL are visually recognized in an superimposed manner. In this case, as illustrated in the drawing, the third mirror 33 allows the reflected component of the image light ML to pass between the first mirror 31 and the second mirror 32.

Figure 3:
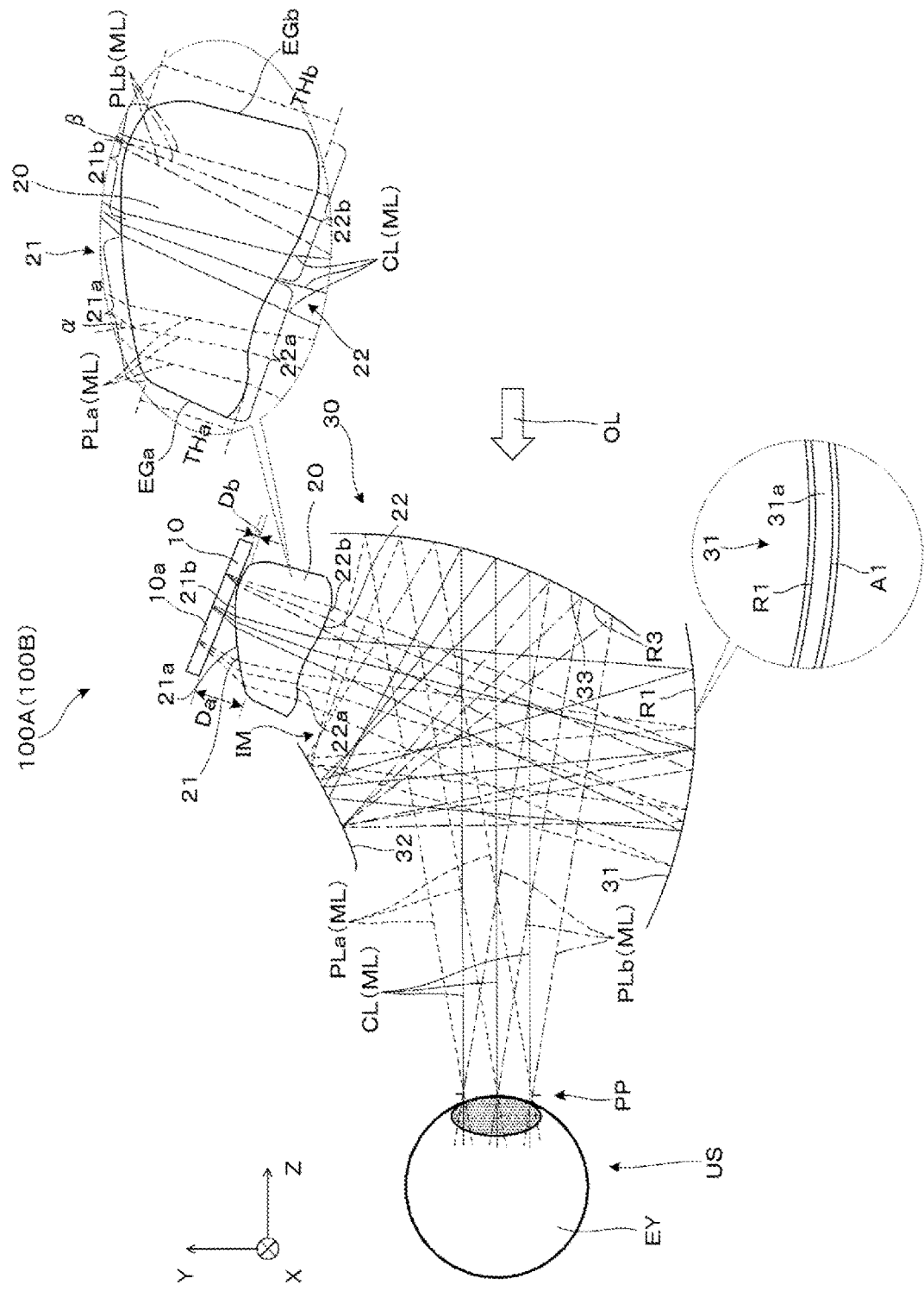
FIG. 3 is a side cross-sectional view for explaining each portion of an optical system constituting the virtual image display device.
Figure 4:
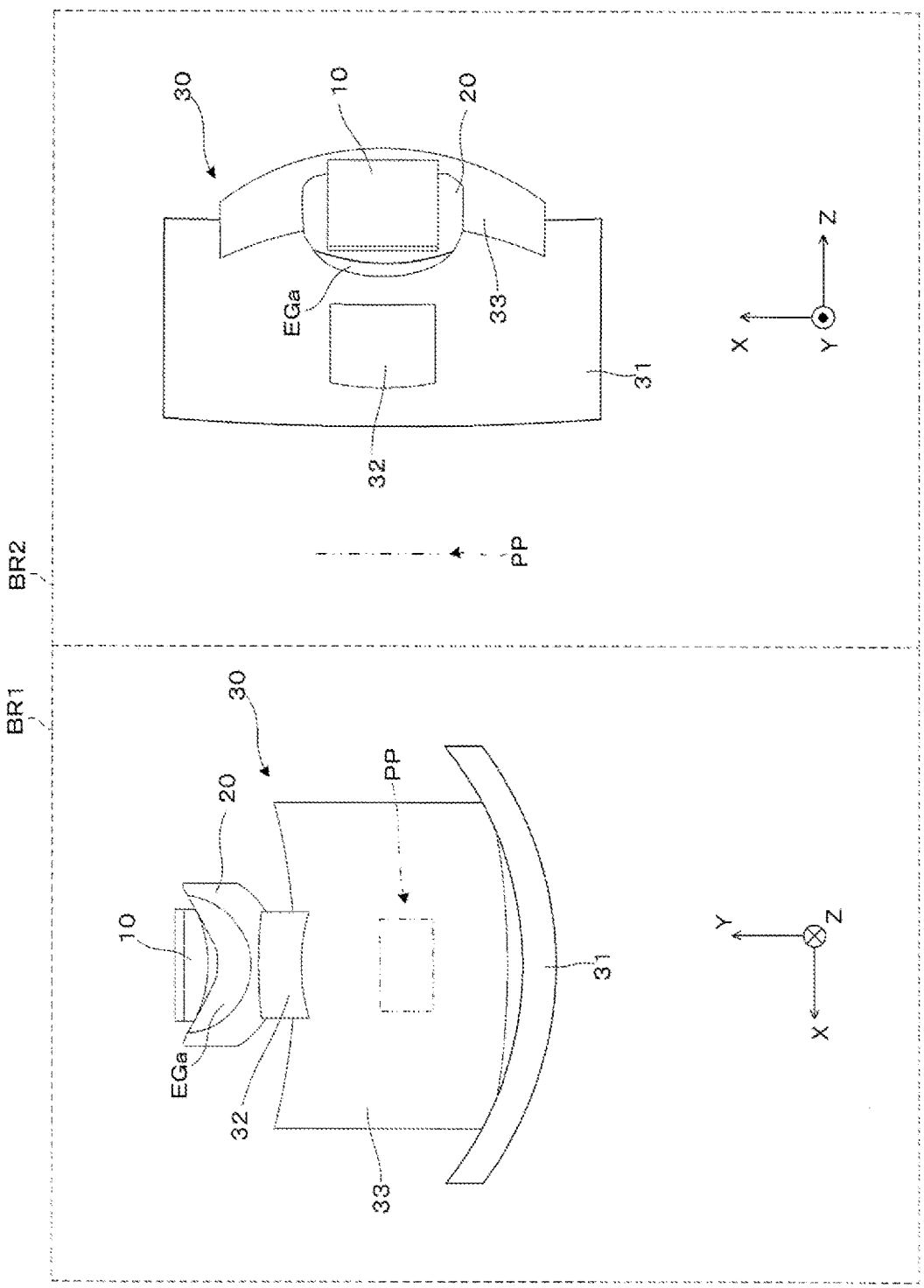
FIG. 4 is a diagram for describing a configuration of the virtual image display device.
Figure 5:
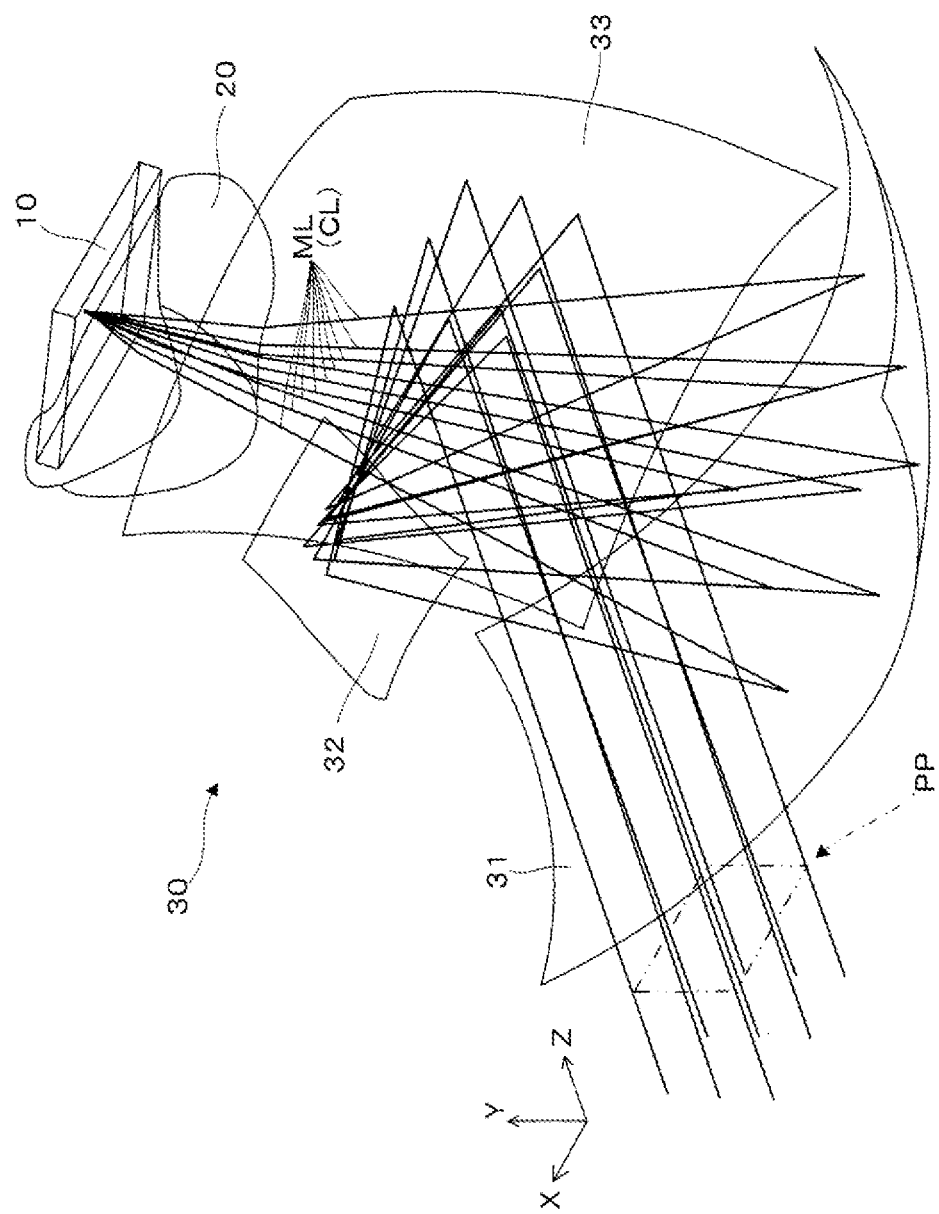
FIG. 5 is a perspective view illustrating the configuration of the virtual image display device.

Hereinafter, with reference to FIG. 3, etc., a configuration of each of the above-described units, a difference due to an optical path of the image light ML, etc. will be described in more detail. FIG. 3 is a side cross-sectional view for describing each portion of the optical system constituting the virtual image display device 200, where in addition to the central component CL which is a component of the central light flux in the image light ML, a first peripheral component PLa emitted from a side closer to the wearer US (eye EY) and a second peripheral component PLb emitted from a side farther from the wearer US (eye EY) in the light emission surface 10a are illustrated as components of peripheral light fluxes. In the drawing, the central component CL is indicated by a solid line, and among the peripheral components, the first peripheral component PLa is indicated by a dashed line, and the second peripheral component PLb is indicated by a dot-dash line. FIG. 4 is a conceptual diagram for describing the configuration of the optical system of the virtual image display device 200, where the first region BR1 illustrates the arrangement of each portion of the optical system by a front view, and the second region BR2 illustrates the arrangement of each portion of the optical system by a plan view. FIG. 5 is a perspective view illustrating a configuration of the virtual image display device 200. In FIG. 5, the image light ML is illustrated with the central component CL as a representative.

The display element 10 illustrated in FIG. 3, etc. is the image light generating unit that emits the image light ML as described above. The display element (image light generating unit) 10 can be configured by various devices. For example, the display element 10 can be configured by a self-luminous display device, and in this case, the display element 10 includes a light emitting portion in order to generate the image light ML. More specifically, the display element 10 is configured by, for example, an organic EL (Organic Electro-Luminescence) display. Here, as an example, the display element 10 is configured by an organic EL display and emits light including various polarizing directions (for example, non-polarized light) as the image light ML from the light emission surface 10a, that is, forms a color still or moving image on the two dimensional light emission surface 10a. However, the display element 10 is not limited to the above-described aspect using the organic EL display, and can be replaced with a micro LED display, or a display device using an inorganic EL, an organic LED, a laser array, a quantum dot light-emitting element, etc. Further, the display element 10 is not limited to a spontaneous light emission type image light generation device, and may include an LCD and another light modulation element, and may form an image by illuminating the light modulation element with a light source (light emitting portion) such as a backlight. As the display element 10, a liquid crystal on silicon (LCOS) (LCoS is a registered trademark), a digital micro-mirror device, etc. may be used instead of an LCD.

The prism 20 is an optical refractive optical element (lens) that is disposed between the display element 10 and the first mirror 31 on the optical path of the image light ML, refracts and transmits the image light ML emitted from the display element 10, and causes the image light ML to be incident on the first mirror 31. As illustrated in FIGS. 3 to 5, the optical system is disposed asymmetrically, has an optical surface that is non-axisymmetric, and is an off-axis optical system, where the optical surface includes a free-curved surface. Therefore, the image light ML has a different degree of refraction (refraction angle) for each position at the time of incidence or emission depending on the incidence position with respect to the prism 20. In particular, in the exemplary embodiment, as illustrated in FIG. 3, a first incident region 21a and a second incident region 21b are provided at the incident portion 21 on which the image light ML is incident in the prism 20. The first incident region 21a is a region on the side close to the wearer US (eye EY), that is, the −Z side in the incident portion 21, and the second incident region 21b is a region on the side far from the wearer US (eye EY), that is, the +Z side in the incident portion 21. Here, as illustrated, a distance Da from the first incident region 21a to the display element (image light generating unit) 10 is greater than a distance Db from the second incident region 21b to the display element 10. That is, the incident position of the first peripheral component PLa indicated by the dashed line among the peripheral components of the image light ML on the incident portion 21 is farther than the incident position of the second peripheral component PLb indicated by the dot-dash line on the incident portion 21. Here, the distances from the incident regions 21a and 21b to the display element 10 can be variously defined. For example, the distances can be defined by the smallest value or the largest value among the distances of straight lines coupling one point on the light emission surface 10a forming the light emission side of the display element 10 and one point on the incident regions 21a and 21b.

Further, as illustrated in FIG. 3 in which a portion of the prism 20 is enlarged, the incident angle of the image light ML to the incident portion 21 is also different between the first incident region 21a and the second incident region 21b, and the incident angle of the image light ML to the first incident region 21a (incident angle $\alpha$ of the first peripheral component PLa) is greater than the incident angle of the image light ML to the second incident region 21b (incident angle $\beta$ of the first peripheral component PLa). That is, $\alpha > \beta$ is satisfied, and among the image light ML incident on the incident portion 21, the component (first peripheral components PLa) incident on the first incident region 21a is refracted more than the component (second peripheral components PLb) incident on the second incident region 21b.

Further, from a different point of view, in the illustrated example, the distance from the first incident region 21a to the third mirror 33 is greater than the distance from the second incident region 21b to the third mirror 33. Here, the distances from the incident regions 21a and 21b to the third mirror 33 can be variously defined. For example, the distances can be defined by the smallest value among the distances coupling one point on the mirror surface representing the third mirror 33 and one point on the incident regions 21a and 21b.

In addition, the prism 20 has, as side surface portions, a first end portion EGa extending from the first incident region 21a and forming a side surface on the −Z side, and a second end portion EGb extending from the second incident region 21b and forming a side surface on the +Z side. In the drawing, the first end portion EGa is thinner than the second end portion EGb. That is, as illustrated in the drawing, when a thickness THa of the first end portion EGa and a thickness THb of the second end portion EGb in the direction along the light flux center of the image light ML (the normal direction of the light emission surface 10a) are compared with each other as viewed from the normal direction of the virtual cross section including the first mirror 31, the second mirror 32, and the prism 20 with respect to the light flux center of the image light ML, the value of the thickness THa is smaller than the value of the thickness THb.

Also, in the illustrated example, the distance from the first end portion EGa to the third mirror 33 is greater than the distance from the second end portion EGb to the third mirror 33. Note that the distance here can be defined similarly to the example described above.

Further, in the emitting portion 22 of the prism 20 which emits the image light ML incident from the incident portion 21, a first emission region 22a which occupies a side coupled to the first end portion EGa, that is, the −Z side, and a second emission region 22b which occupies a side coupled to the second end portion EGb, that is, the +Z side are provided. The first emission region 22a includes a concave surface, and the second emission region 22b includes a convex surface. That is, the first emission region 22a has a surface that is concave inward in a direction along the center of the light flux of the image light ML (normal direction of the light emission surface 10a), and the second emission region 22b has a surface that is convex outward in a direction along the center of the light flux of the image light ML (normal direction of the light emission surface 10a).

Also, in the illustrated example, the distance from the first emission region 22a to the third mirror 33 is greater than the distance from the second emission region 22b to the third mirror 33. Note that the distance here can be defined similarly to the example described above.

Since the prism 20 has the asymmetric shape as described above, the prism 20 serves as an optical member on which the image light ML from the display element (image light generating unit) 10 is incident and which emits the image light ML toward the first mirror 31, and can avoid or suppress an increase in size of the first mirror 31. That is, in the case of the present exemplary embodiment, in the prism 20 of the virtual image display device 200, the peripheral component of the image light ML is prevented from expanding with the wide angle of view of the image.

The first mirror 31 is disposed on the light emission side of the prism 20, and reflects (back) the image light ML emitted from the prism 20. Note that the first mirror 31 reflects the image light ML at a high efficiency due to the mirror reflection, that is, reflects 100% or nearly 100% of the image light ML.

As illustrated in a partially enlarged view of the first mirror 31 in FIG. 3, the first mirror 31 is formed by forming a reflective film (reflective surface) R1 on a resin-made base material 31a by mirror deposition, etc. In addition, for example, a light absorption film A1 may be provided at a surface of the base material 31a opposite to the surface at which the reflective film R1 is provided in order to prevent leakage light. Note that in this case, the light absorption film A1 may function as a counter film for maintaining the shape of the base material 31a (which does not cause shape change) during the film formation of the reflective film R1. Alternatively, it is conceivable that the light absorption film A1 is a film for exclusively functioning as a counter film and has no light absorption action. By providing the counter film, it is possible to maintain the shape of the reflective surface with necessary accuracy even when the base material 31a is thin (for example, about 1 mm) and has a certain degree of curvature to form a reflective surface by a free-curved surface.

Also, as illustrated in FIGS. 3 to 5, the first mirror 31 has a free-curved surface similar to the incident portion (incident surface) 21, the emitting portion (emission surface) 22, or the other reflection member (second mirror 32, third mirror 33) of the prism 20. Furthermore, the first mirror 31 has a free-curved surface and functions as a convex lens together with the prism 20, thereby converging the entire light flux of the image light ML and directing the light flux toward the second mirror 32. This reduces the size of the second mirror 32.

As described above, the second mirror 32 is disposed on the light emission side of the first mirror 31, and the image light ML bent (reflected) at the first mirror 31 is further reflected (back) and emits the image light ML toward the third mirror 33. In the illustrated example, the second mirror 32 is provided above (on the +Y side of) the third mirror 33, and the image light ML is projected obliquely downward from the second mirror 32 toward the third mirror 33. Accordingly, since the third mirror 33 is a half mirror, even when a partial component of the image light ML is transmitted through the third mirror 33, it is possible to avoid or reduce a situation in which the transmitted component enters eyes of a person other than the wearer and an image is viewed.

Similarly to the first mirror 31, the second mirror 32 has a free-curved surface and reflects the image light ML at a high efficiency due to the mirror reflection, that is, reflects 100% or nearly 100% of the image light ML. As for the structure, similarly to the first mirror 31, it is conceivable that a reflective film is formed at the surface of the resin-made base material 31a by mirror deposition, etc, and a light absorption film is further provided (not illustrated).

The third mirror 33 is a half mirror having semi-transmissive properties as described above, and is disposed on the light emission side of the second mirror 32. The image light ML having passed through the second mirror 32 is partially reflected by the third mirror 33. Here, the image light ML reflected by the third mirror 33 is directed toward the exit pupil PP, which is the assumed position of the eye EY (the position of the exit pupil). For example, the reflective component of the image light ML in the third mirror 33 with respect to the central component CL is directed toward the −Z direction and reaches the exit pupil PP. The first peripheral component PLa and the second peripheral component PLb, which are reflective components other than the central component CL, similarly reach the exit pupil PP. The exit pupil PP is at a position where the image light ML from each point on the light emission surface 10a is incident so as to be superimposed from the angle direction corresponding to the position of each point on the light emission surface 10a in a predetermined divergence state. Note that a transparent reflective surface R3 is formed by a film having semi-transmissive properties in the third mirror 33.

Note that various configurations are conceivable for the reflection transmittance in the third mirror 33 as the half mirror, but it is conceivable to form a half mirror film such that the reflectance is approximately 50%, and the transmittance is approximately 50%, for example. In the case of the present exemplary embodiment, the first mirror 31 and the second mirror 32 other than the third mirror 33 are high-efficiency reflection mirrors, and the image light ML passes through the third mirror 33 only once. Therefore, it is possible to maintain high utilization efficiency of the image light ML as the entire optical system compared to, for example, a birdbath type optical system that passes through a half mirror, etc. over a plurality of times.

Figure 6:
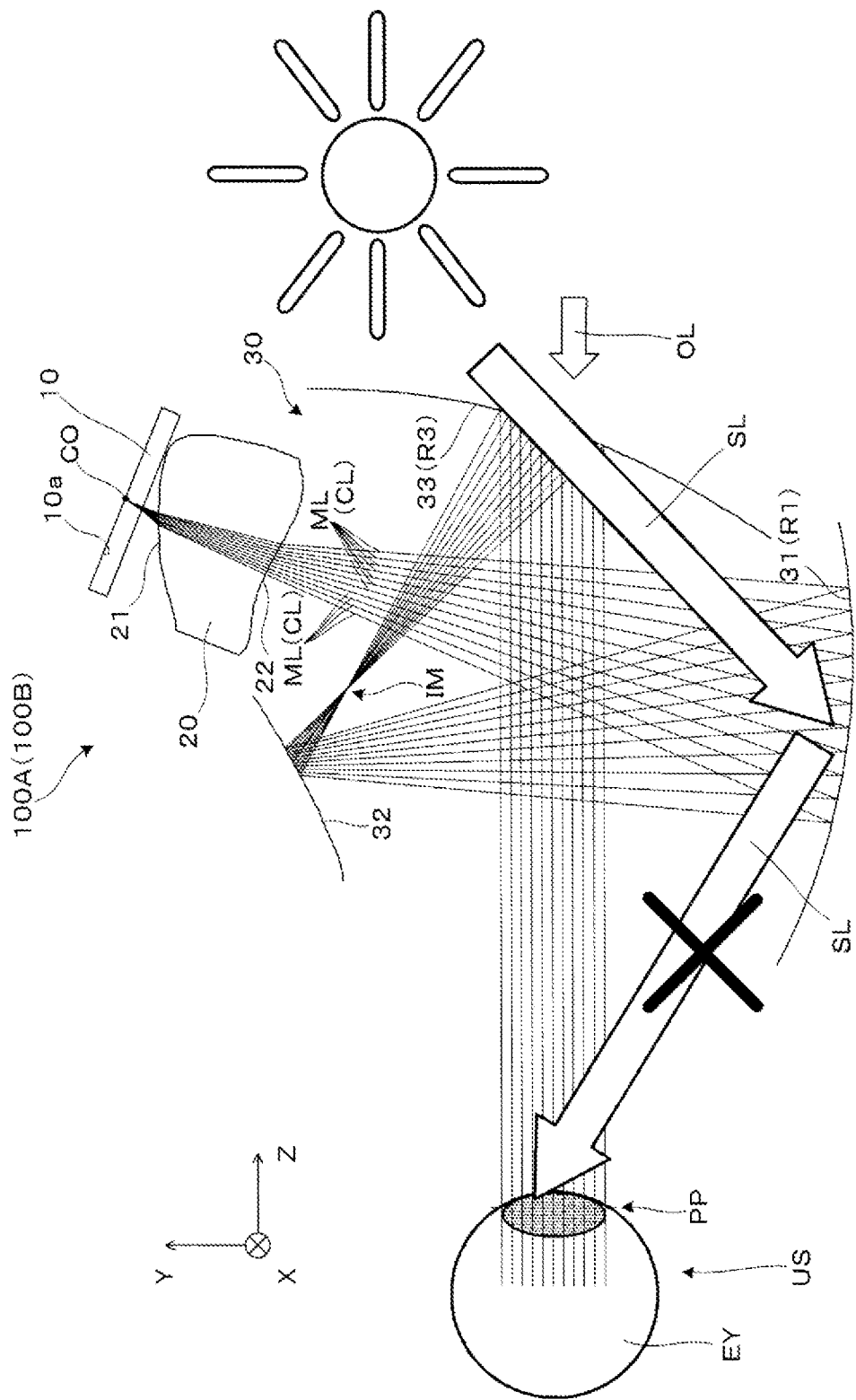
FIG. 6 is a conceptual diagram illustrating reflection of outside light (external light) in an unintended direction and suppression thereof.

Here, as illustrated in FIG. 3, etc., the reflective film R1 of the first mirror 31 is disposed close to the eye EY and faces upward, that is, is disposed to reflect light in the +Y direction. Therefore, for example, as illustrated in FIG. 6 corresponding to FIG. 2, there is a problem of light SL which is a component of sunlight, etc. in the light from the outside and is reflected by the first mirror 31 in an unintended direction that is directed toward the eye EY and adversely affects visual recognition. In contrast, in the present exemplary embodiment, by providing the angular dependence on the first mirror 31 (reflective film R1) so as not to reflect the light SL, it is possible to avoid or suppress the light SL toward the eye EY as illustrated.

Figure 7:
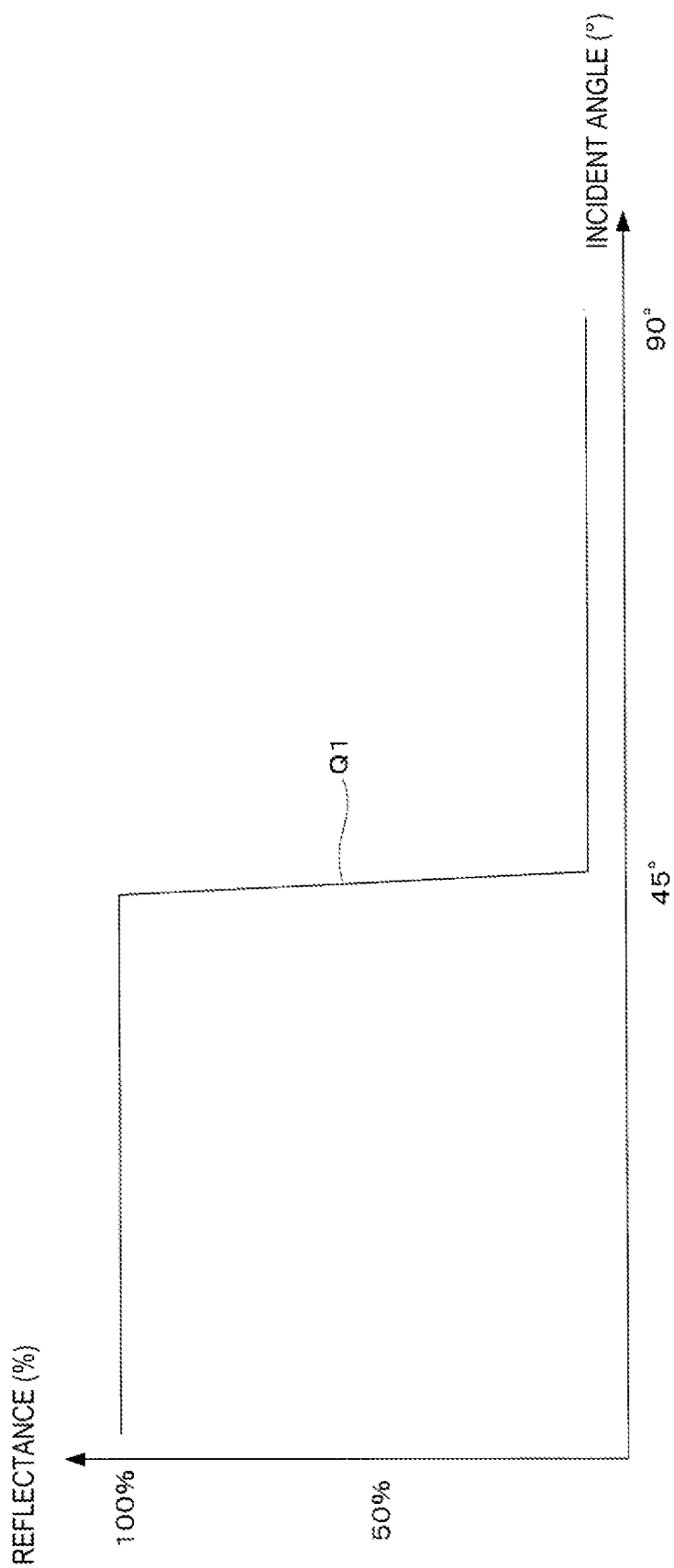
FIG. 7 is a graph for describing an angular dependence of a first mirror.

FIG. 7 is a graph for describing the angular dependence of the first mirror 31 constituting the virtual image display device 200 according to the present exemplary embodiment or the reflective surface (reflective film) R1 in the first mirror 31. The horizontal axis of the graph indicates the incident angle (unit: °) of the light to the first mirror 31, and the vertical axis indicates the reflectance (unit: %) of the first mirror 31 with respect to the incident angle of the light. As indicated by the curved line (or polygonal line) Q1, the first mirror 31 (reflective film R1) has a characteristic of exhibiting high reflectivity (reflectance) with respect to light incident at an incident angle of 45° or less and exhibiting very low reflectivity (reflectance) with respect to light incident at an angle greater than 45° as an angular dependence. That is, in the first mirror 31 (reflective film R1), the reflectance of light incident at an angle of 45° or less is higher than the reflectance of light incident at an angle greater than 45°. The reflective film R1 having the above-described angular dependence may be formed of, for example, a dielectric multilayer film.

In the case of the first mirror 31 illustrated in FIG. 3, etc., it is assumed that the incident angle of the image light ML incident on the first mirror 31 is relatively small, and even in a case where the image light ML forms an image having a relatively wide angle of view, the maximum incident angle of the image light ML with respect to the first mirror 31 is about 30°. Therefore, in the first mirror 31, if high reflectivity is maintained in a range of at least about 30°, and more desirably, in a range of about 45°, it is considered to be sufficient to secure reflection of the image light ML.

On the other hand, a component such as the light SL illustrated in FIG. 6, that is, a component reflected by the first mirror 31 (reflective film R1) and directed toward the eye EY is assumed to be incident on the first mirror 31 at an angle greater than or equal to a certain degree. Therefore, since the first mirror 31 has the angular dependence as described above, it is possible to appropriately avoid or suppress the light SL toward the eye EY.

Furthermore, the third mirror 33 may have an angular dependence as described above. For example, the third mirror 33 may have an angular dependence on the transparent reflective surface R3 that transmits or reflects the image light ML or the external light OL, and the reflectance of light incident at an angle greater than 45° may be higher than the reflectance of light incident at an angle of 45° or less on the transparent reflective surface R3. Note that it is assumed that the incident angle of the image light ML incident on the third mirror 33 is also relatively small, and even in a case where the image light ML forms an image having a relatively wide angle of view, the maximum incident angle of the image light ML with respect to the first mirror 31 is about 30°.

As described above, the virtual image display device 200 according to the present exemplary embodiment includes the display element 10, which is the image light generating unit that generates the image light ML, the first mirror 31 that reflects the image light ML, the second mirror 32 that reflects the image light ML reflected by the first mirror 31, and the third mirror 33 that transmits the external light OL and reflect part of the image light ML reflected by the second mirror 32 toward the position of the exit pupil PP, wherein the first mirror 31 has the angular dependence such that the reflectance varies depending on the angle of incidence of the image light. In the virtual image display device 200, the external light OL is transmitted through the third mirror 33 and part of the image light ML reflected by the second mirror 32 is reflected toward the position of the exit pupil PP, so that so-called see-through visual recognition is possible. On the other hand, since the first mirror 31 has the angular dependence depending on the angle at which the image light ML is incident, it is possible to maintain appropriate reflection for the image light ML and to avoid or suppress generation of ghost light, etc. due to reflection of an unintended component (light SL in FIG. 6, etc.) from the outside.

In addition, in the case of the above-described aspect, by making the distances from the first incident region 21a to the display element 10 greater than the distance from the second incident region 21b to the display element 10 in the prism 20, in the first incident region 21a and the second incident region 21b, it is possible to avoid or suppress an increase in the size of a plurality of mirrors (the first mirror 31, etc.) as reflective surfaces provided in the subsequent stage of the optical path of the prism 20, an increase in the size of the first mirror 31 in particular, and an increase in the size of the entire device.

Furthermore, in the case of the above-described aspect, by adopting a free-curved surface as the refractive surface and the reflective surface in each optical system, the occurrence of image distortion (distortion aberration) is suppressed while maintaining the size of each optical system in a small angle. Also, the resolution can be maintained well.

Figure 8:
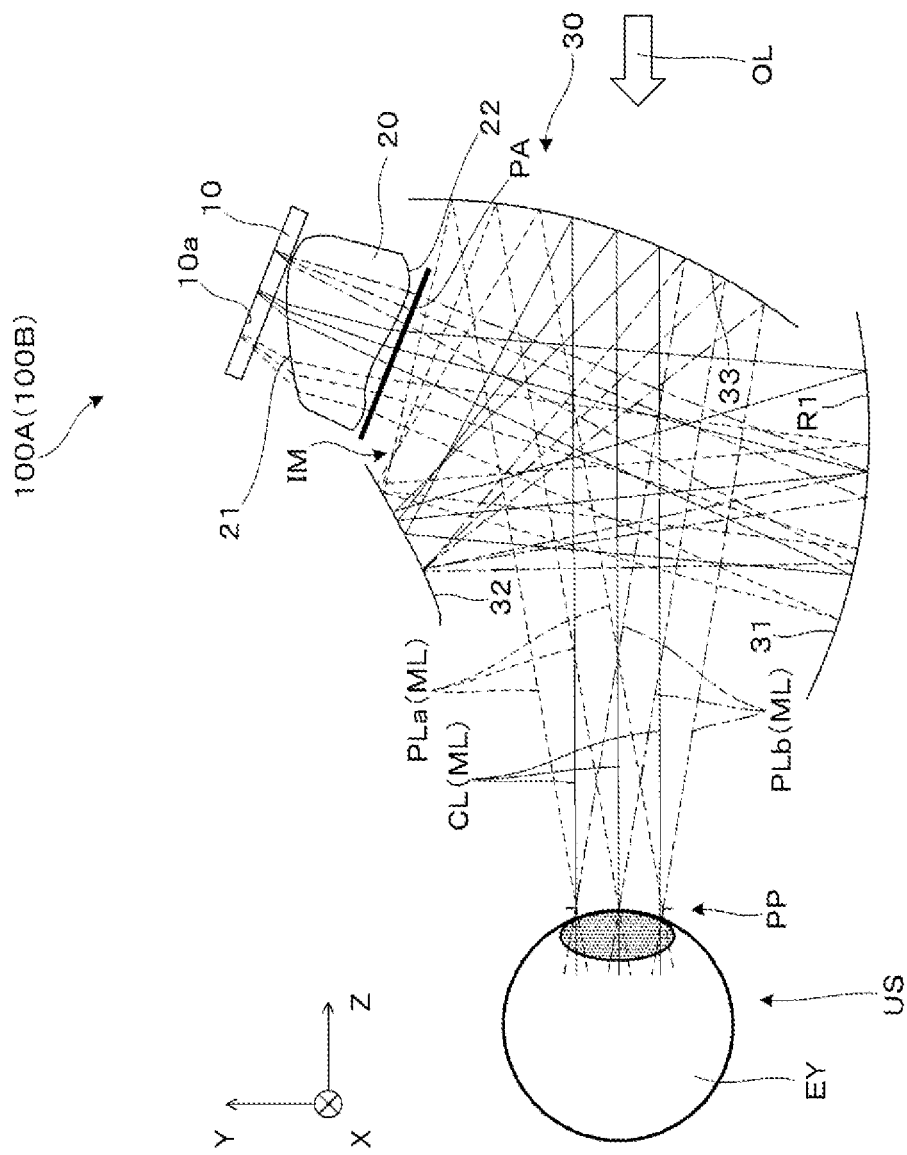
FIG. 8 is a side cross-sectional view for describing a virtual image display device according to a modification example.

Hereinafter, a virtual image display device 200 according to a modification example will be described with reference to FIG. 8. In the present modification example, the third mirror 33 is a polarizing mirror that reflects light in a specific polarization state. In addition, the virtual image display device 200 further includes a polarizing plate PA that causes the image light ML to be in a polarization state according to the polarization characteristics of the third mirror 33. FIG. 8 illustrates, as an example, a case where the polarizing plate PA is provided at the optical path between the prism 20 and the first mirror 31 in the optical path of the image light ML, and the third mirror 33 is provided at a position not intersecting with the image light ML reflected toward the position of the exit pupil PP. In this case, the image light ML is polarized by the polarizing plate PA to be in a specific polarization state according to the reflection characteristics of the third mirror 33 (for example, the image light ML becomes S-polarized light when the image light ML is incident on the third mirror 33 which is a polarizing mirror exhibiting higher reflection characteristics for S-polarized light than for P-polarized light). As a result, the image light ML is reflected by the third mirror 33 with high efficiency. In the above description, the polarizing plate PA is provided at the optical path between the prism 20 and the first mirror 31 in the optical path of the image light ML. However, for example, an aspect in which the polarizing plate PA is provided at the optical path from the display element 10 which is the image light generating unit to the prism 20 is also considered. By providing the polarizing plate PA, it is possible to increase the utilization efficiency of the image light ML.

In addition, with respect to the third mirror 33 having the above-described aspect, the display element 10 serving as the image light generating unit may emit the image light ML in a polarization state corresponding to the polarization characteristics of the third mirror 33 serving as the polarizing mirror. As the display element 10, for example, by adopting an LCD that forms an image by being illuminated by a light source (light emitting portion) serving as a backlight, it is conceivable to cause the image light ML to be emitted in a state of being S-polarized light with respect to the third mirror 33. In this case, it is also possible to adopt a configuration in which the polarizing plate PA illustrated in FIG. 8 is not provided.

Second Exemplary Embodiment

Hereinafter, a virtual image display device according to the second exemplary embodiment will be described with reference to FIG. 9, etc. In addition, a virtual image display device as an example of the virtual image display device according to the present exemplary embodiment is obtained by partially changing the virtual image display device 200 according to the first exemplary embodiment, and a configuration other than the configuration of the optical system that guides the image light ML is similar to that in the case of the first exemplary embodiment, so that detailed illustration and description of the entire configuration, etc. are omitted, and matters described with reference to other drawings are appropriately incorporated as necessary.

Figure 2:
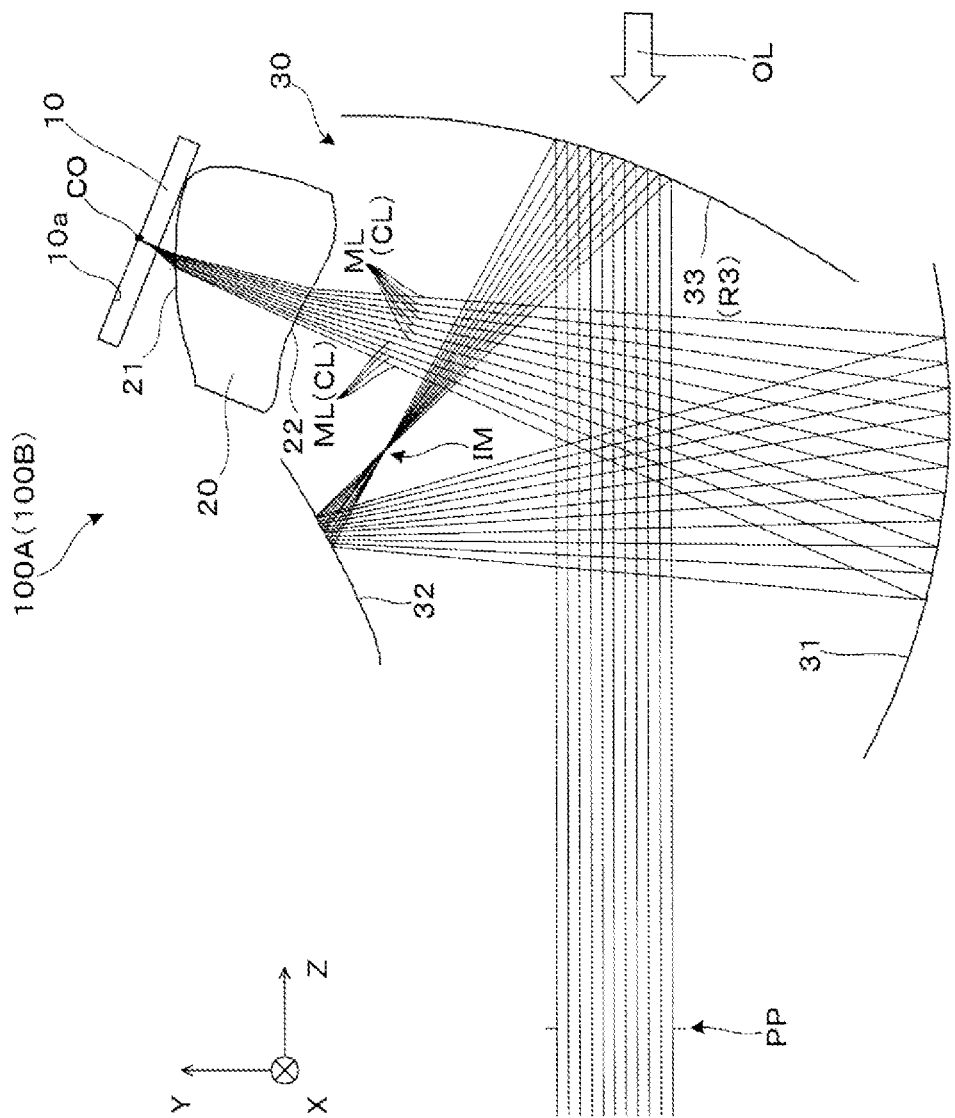
FIG. 2 is a conceptual side cross-sectional view illustrating an optical path of image light in the virtual image display device.
Figure 9:
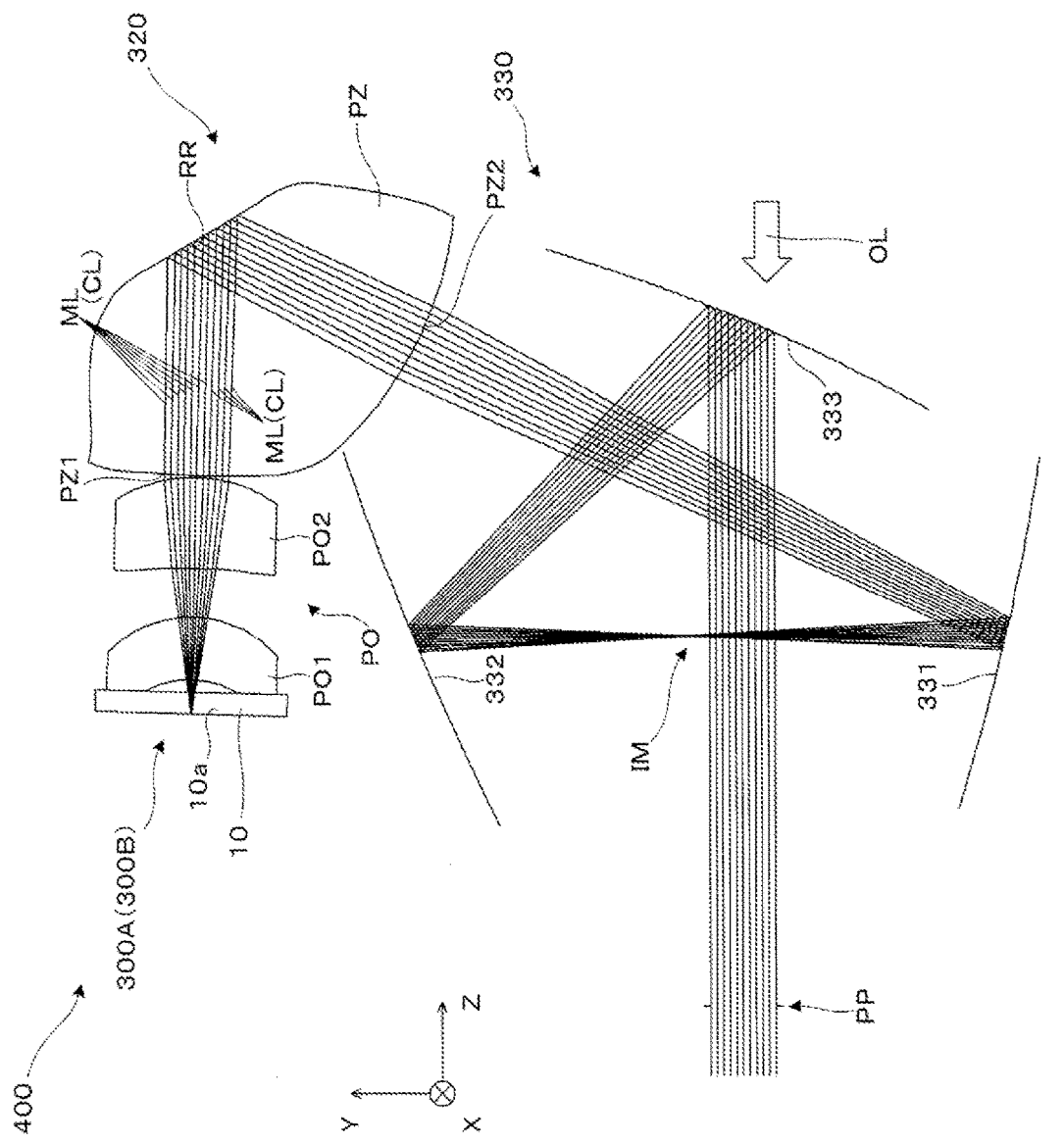
FIG. 9 is a conceptual side cross-sectional view illustrating an optical path of image light in a virtual image display device according to a second exemplary embodiment.
Figure 10:
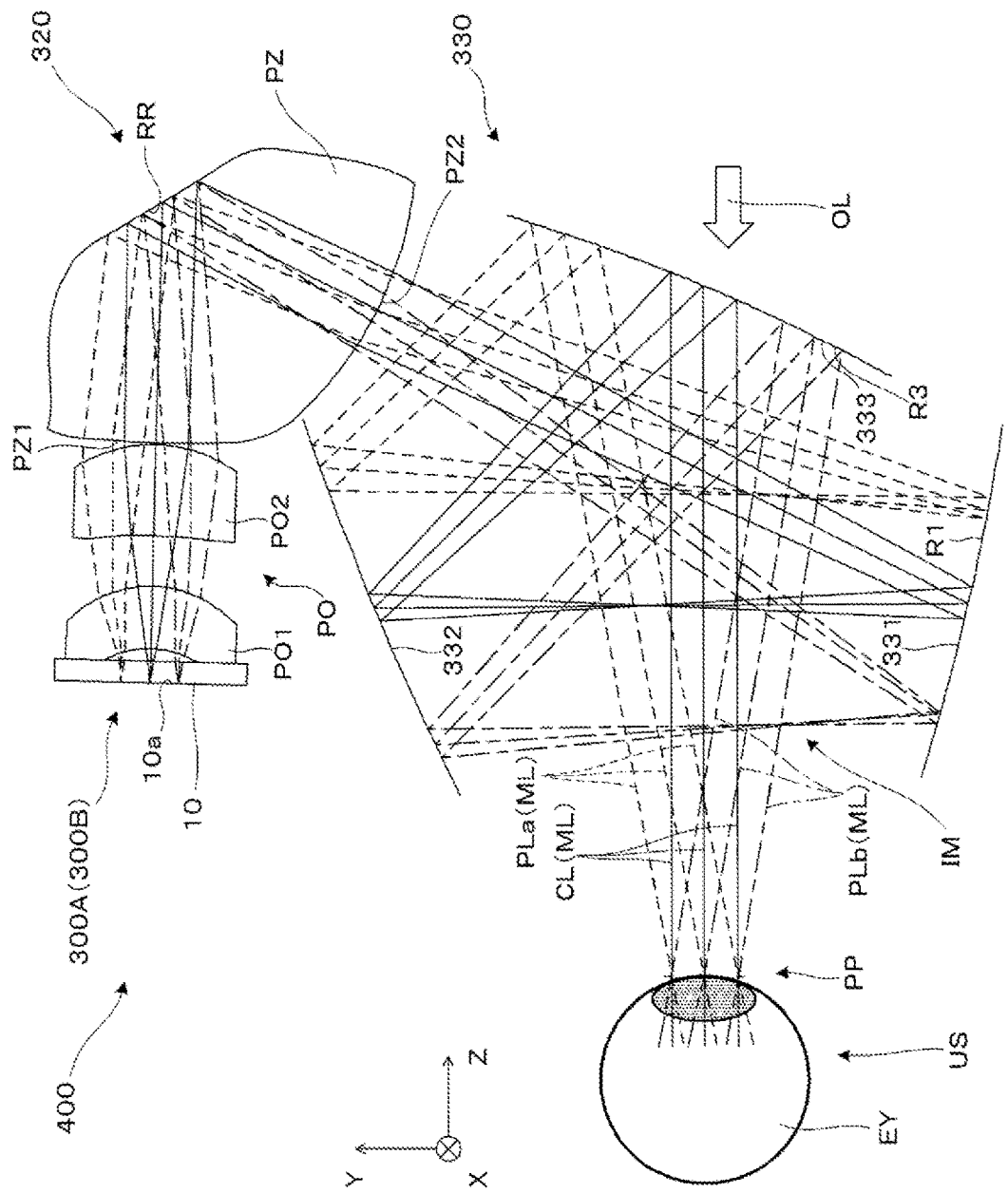
FIG. 10 is a side cross-sectional view for explaining each portion of an optical system constituting the virtual image display device.
Figure 11:
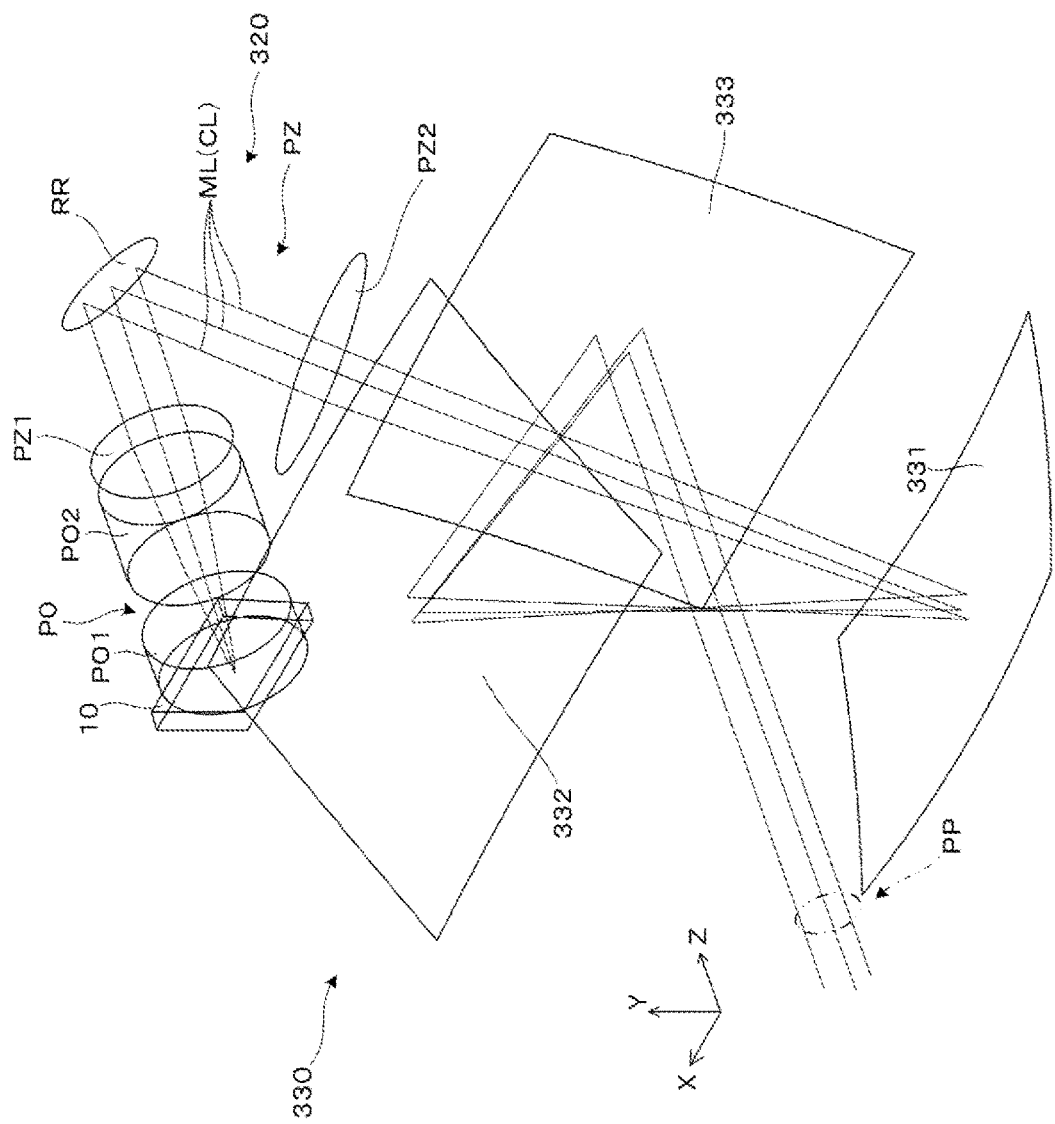
FIG. 11 is a perspective view illustrating the configuration of the virtual image display device.

FIG. 9 is a conceptual side cross-sectional view illustrating an optical path of the image light ML in a virtual image display device 400 according to the present exemplary embodiment, and corresponds to FIG. 2. FIG. 10 is a side cross-sectional view for describing each portion of an optical system constituting the virtual image display device 400, and corresponds to a portion, etc. of FIG. 3. FIG. 11 is a perspective view illustrating a configuration of the virtual image display device 400, and corresponds to FIG. 5. Note that in FIG. 11, only a location where the image light ML is refracted or reflected in the prism member PZ described below is illustrated.

As illustrated in FIGS. 9 to 11, a first display device 300A for the right eye a second display device 300B for the left eye constituting the virtual image display device 400 according to the present exemplary embodiment are configured as a left and right pair similarly to the right-eye first display device 100A and the left-eye second display device 100B illustrated in FIG. 1, etc. so that, one first display device 300A is illustrated. Note that the overall appearance and configuration of the virtual image display device 400 is similar to that of the virtual image display device 200 in FIG. 1.

As illustrated in FIG. 9, etc. the first display device 300A includes, as portions having optical functions, a display element 10, which is an image light generating unit that emits image light ML, an optical member 320 on which the image light ML from the display element 10 is incident, and a reflective optical element 330 that is configured by three reflection members (a first mirror 331, a second mirror 332, and a third mirror 333) that reflect the image light ML from the optical member 320. Similarly to the second mirror 32 in the first exemplary embodiment, the second mirror 332 in the reflective optical element 330 has an angular dependence regarding reflection of light. Note that the third mirror 333 can also have an angular dependence in the same manner as in the third mirror 33 in the first exemplary embodiment.

The optical member 320 is a member that is provided at an optical path from the display element 10 serving as an image light generating unit to the first mirror 331 and emits the image light ML from the display element 10 toward the first mirror 331. In the illustrated example, the optical member 320 includes a projection lens PO and a prism member Z. Note that, in the optical member 320, the prism member Z is referred to as a first optical member, and the projection lens PO is referred to as a second optical member.

The projection lens (second optical member) PO includes a first lens P01 and a second lens PO2, and emits the image light ML emitted from the display element 10 toward an incident portion PZ1, which is described later, of the prism member PZ.

On the other hand, the prism member Z (first optical member) includes an incident portion PZ1 on which the image light ML is incident, a reflecting portion RR that reflects the image light ML incident from the incident portion PZ1, and an emitting portion PZ2 that emits the image light ML reflected by the reflecting portion RR toward the first mirror 331.

In the first display device 300A configured as described above, first, the image light ML emitted from the light emission surface 10a of the display element 10 is emitted from the projection lens PO toward the prism member PZ, and enters and refracts on the incident portion PZ1. The image light ML incident on the inside of the prism member PZ from the incident portion PZ1 is reflected (inner surface reflection) by the reflecting portion RR, travels toward the emitting portion PZ2, and is refracted and emitted from the emitting portion PZ2, thereby being projected in a direction having a component in the downward direction (−Y direction). The image light ML having passed through the prism member PZ is first reflected by the first mirror 331 located at the lowest position among the first mirror 331, the second mirror 332, and the third mirror 333 which are three reflection members located below the prism member PZ and constituting the reflective optical element 330, and travels toward the second mirror 332 located in a direction having a component in the upward direction (+Y direction). That is, the first mirror 331 is located below the optical member 320 including the prism member PZ and the second mirror 332 when mounted, and reflects the image light ML projected downward from the optical member 320 upward.

The image light ML having passed through the first mirror 331 is reflected by the second mirror 332 and is again directed downward, and then is incident on the third mirror 333. The third mirror 333 bends the image light ML from the second mirror 332 parallel to the exit pupil PP that is to be a position of the eye EY of the wearer US.

Also in the above case, similarly to the case of the first display device 100A illustrated in FIG. 2, etc., the optical path of the image light ML from the prism member PZ to the first mirror 331 intersects with the optical path of the image light ML from the second mirror 332 to the third mirror 333, and intersects with the optical path of the image light ML from the third mirror 333 toward the position of the exit pupil PP. That is, in the reflective optical element 330, the optical path of the image light ML is bent so as to intersect over a plurality of times, and thus, the entire optical system is miniaturized while having a certain optical path length.

Further, as another optical aspect, the optical member 320 and the first mirror 331 collectively function as a convex lens. In addition, in the illustrated example, an intermediate image IM is formed between the first mirror 331 and the second mirror 332.

Note that the third mirror 333 functions as a half mirror having semi-transmissive properties, and thus the same applies to the case of a see-through type optical system similarly.

Figure 12:
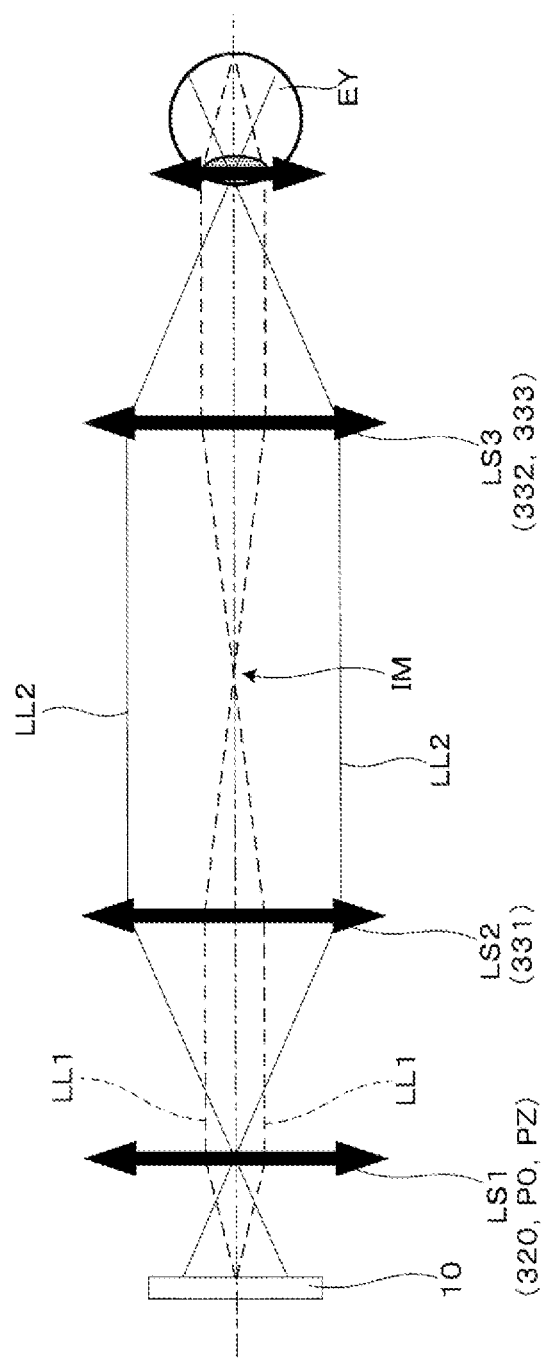
FIG. 12 is a conceptual diagram for describing the principle of the optical system.

Hereinafter, the principle of the optical system constituting the first display device 300A will be described with reference to FIG. 12. FIG. 12 is a diagram conceptually illustrating a developed state of an optical system constituting the first display device 300A. In the illustrated illustration, the light beam LL1 indicated by the dashed line indicates the state of the peripheral light emitted from one point source, and the point at which the light beam LL1 intersects in the drawing indicates the imaging position such as the position of the intermediate image IM. On the other hand, the light beam LL2 indicated by the solid line indicates the state of the main ray emitted from the different point light sources, and the point at which the light beam LL2 intersects in the drawing indicates the position of the pupil. For example, when the diaphragm is provided, it is desirable to provide the diaphragm in the vicinity of this point or the vicinity of this point. Further, a first lens group LS1 indicated by a reciprocating arrow corresponds to the optical member 320, that is, the projection lens PO and the prism member PZ, a second lens group LS2 corresponds to the first mirror 331, and a third lens group LS3 corresponds to the second mirror 332 and the third mirror 333. Note that the fourth reciprocating arrow corresponds to a human eye EY (lens) that functions as a lens.

Here, in the illustrated illustration, the focal length of the first lens group LS1 is L, and the focal length of the second lens group LS2 and the third lens group LS3 is 2 L (i.e., twice as long as L). That is, while the power of the first lens group LS1 is relatively strong, the powers of the second lens group LS2 and the third lens group LS3 are relatively weak. In other words, the load of the power is increased on the first lens group LS1 side, that is, the projection side, whereas the power is decreased on the second lens group LS2 and the third lens group LS3, that is, on the side close to the eye EY (the position of the exit pupil PP), thereby forming an optical system requiring a long distance. Thus, the three mirrors (the first mirror 331, the second mirror 332, and the third mirror 333) are configured to suppress distortion while ensuring a distance. In the case of this configuration, the optical system itself is an eccentric system, however, since distortion correction is easily performed, it is possible to configure an optical system in which correction is favorably performed with a configuration of only a rotationally symmetric system. That is, the first mirror 331, the second mirror 332, the third mirror 333, the prism member PZ, and the projection lens PO can be a rotationally symmetric optical system. With respect to the above configuration, it can also be understood that the above configuration is achieved by performing correction using a plurality of lenses in the first lens group LS1 (the projection lens PO and the prism member PZ) having relatively strong power. That is, in the illustrated example, the projection lens PO is constituted by two refractive optical systems (lenses PO1 and PO2 illustrated in FIG. 9, etc.), and the prism member PZ is constituted by two refractive incident surfaces and one reflective surface.

Figure 13:
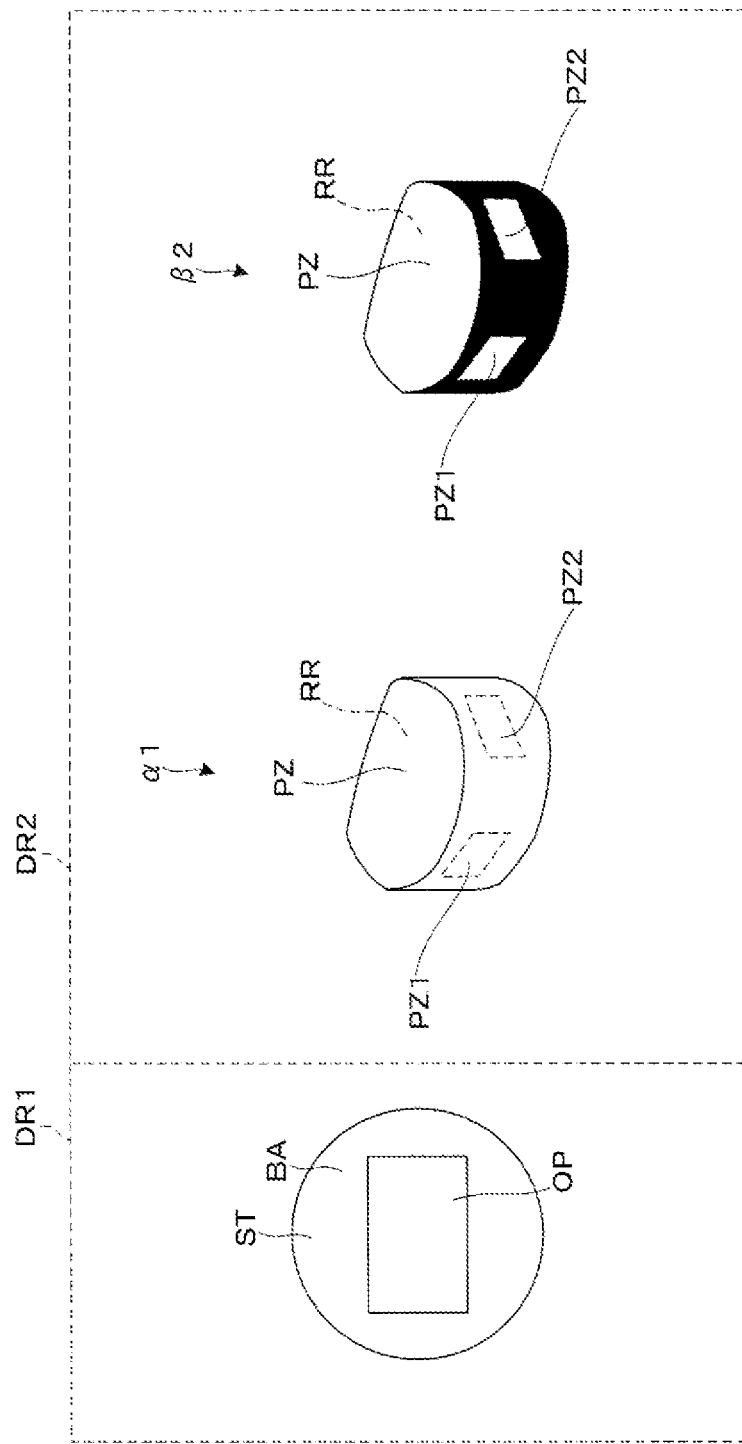
FIG. 13 is a conceptual diagram for describing a diaphragm (light shielding portion).

Referring now to FIG. 13, a configuration example for the diaphragm (light shielding portion, aperture) ST is described. In the drawing, the first region DR1 conceptually illustrates a plate-shaped diaphragm. For example, as illustrated in the drawing, the diaphragm ST may be formed by providing an opening OP having a shape (for example, a rectangular shape) corresponding to the contour shape of the image light ML in a central portion of a disc-shaped plate member BA. As described with reference to FIG. 12, in the case illustrated in FIG. 12, the diaphragm ST is preferably located at a point where the light beams LL2 intersect. In other words, it is desirable that the diaphragm ST disposed at a position from the projection lens PO to the prism member PZ. Therefore, as illustrated in the second region DR2 as another example, the prism member PZ illustrated in the state al may be made to function as the diaphragm ST by being blackened (light shielding mask) around the incident portion PZ1 and the emitting portion PZ2 as illustrated in the state 132. In particular, providing the diaphragm ST around at least the emitting portion PZ2 is expected to results in effective light shielding. That is, it is possible to adopt a configuration in which the emitting portion PZ2 includes a diaphragm (light shielding portion) that shields part of the image light ML reflected by the reflecting portion RR. Note that, in the above-described aspect, the reflecting portion RR may be subjected to black coating around a portion necessary for reflection.

Figure 14:
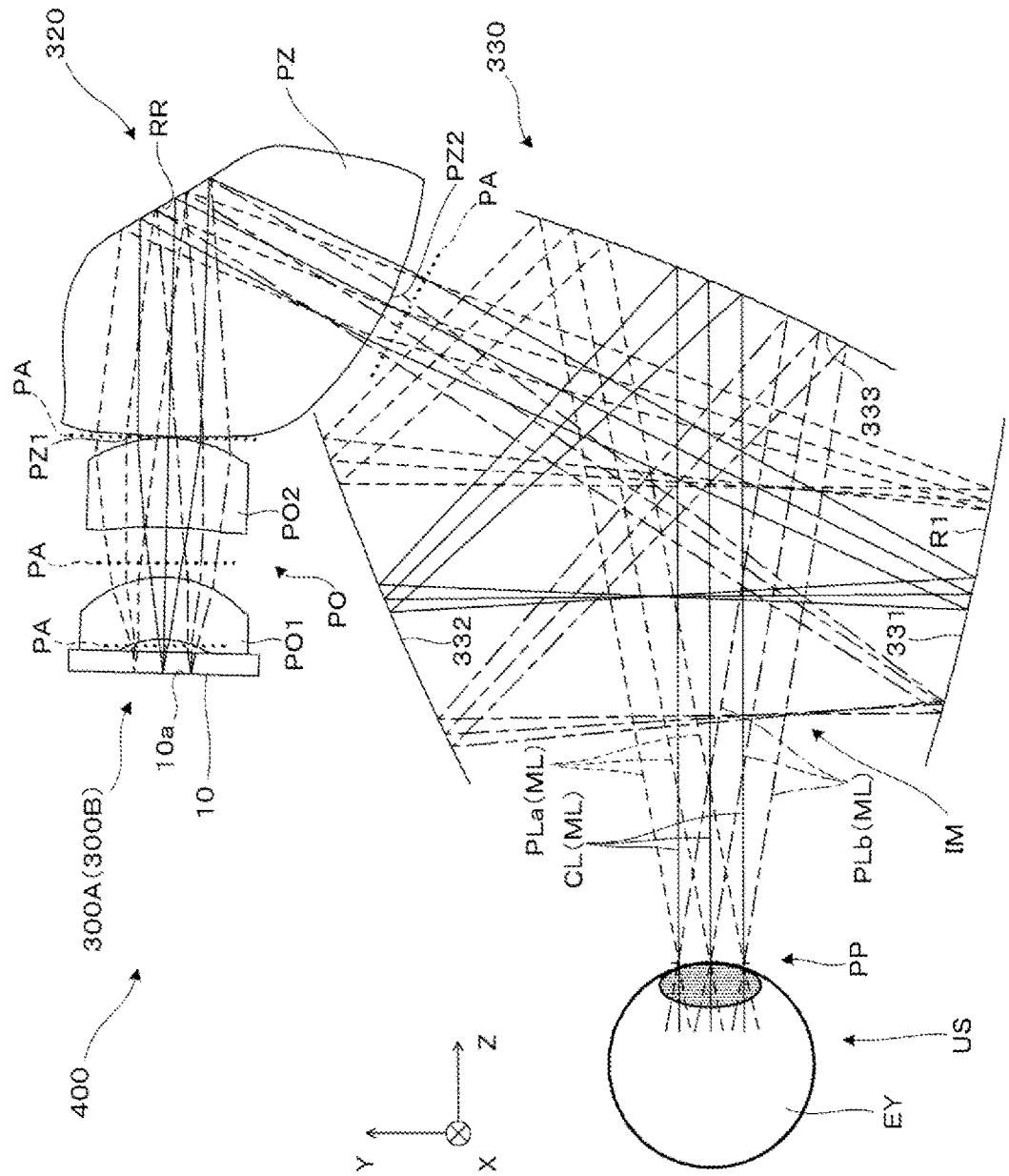
FIG. 14 is a side cross-sectional view for describing a virtual image display device according to a modification example.

Hereinafter, the virtual image display device 400 according to a modification example will be described with reference to FIG. 14. FIG. 14 is a view corresponding to FIG. 8. That is, in the present modification example, a case where the polarizing plate PA is provided in the virtual image display device 400 is illustrated, and in FIG. 14, a place which is a candidate for an arrangement place of the polarizing plate PA is indicated by a dashed line. That is, as an example of a place where the polarizing plate PA can be disposed, a place immediately after the display device 10, a place between the projection lens PO, that is, the first lens PO1 and the second lens PO2, a place before the prism member PZ (the position of the incident portion PZ1) or a place after the prism member PZ (the position of the emitting portion PZ2), etc. can be considered. That is, various portions on the optical path from the display element 10 which is the image light generating unit to the first mirror 331 can be used as the polarizing plate PA. By providing the polarizing plate PA at any of these positions, it is possible to increase the utilization efficiency of the image light ML in the same manner as described with reference to FIG. 8.

Figure 15:
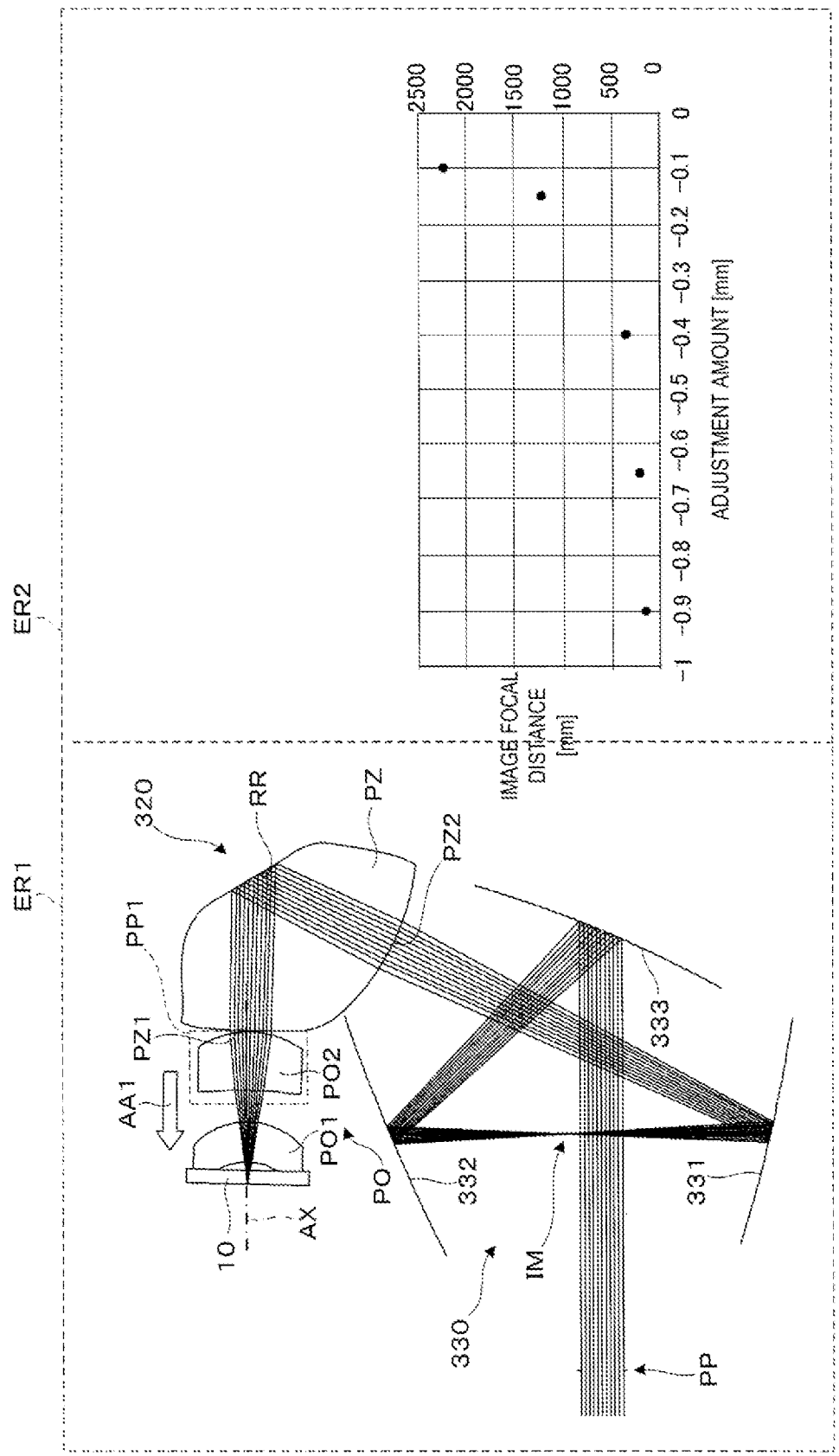
FIG. 15 is a diagram for describing a virtual image display device according to another modification example.

Hereinafter, the virtual image display device 400 according to another modification example will be described with reference to FIG. 15. As described with reference to FIG. 12, in the present exemplary embodiment, the optical system can be a rotationally symmetric system and a system with little distortion. In this case, even when a portion of the optical system is slightly moved in the light ray traveling direction (optical axis direction), the entire image is considered to be uniformly changed. Therefore, here, the image focal distance is adjusted by utilizing this property. To be more specific, as in the example illustrated in the first region ER1, the second lens PP1 of the projection lens PO surrounded by the dashed line PO2 is movable (adjustable) in the direction (negative direction) illustrated by the arrow AA1 along the optical axis AX illustrated by the dot-dash line. The graph illustrated in the second region ER2 is obtained by plotting the relationship between the adjustment amount (movement amount of the second lens PO2) when the second lens PO2 is moved to the display element 10 side and the image focal distance. That is, in the illustrated graph, the horizontal axis indicates the adjustment amount, that is, a value (negative value) obtained by moving the second lens PO2 in the direction indicated by the arrow AA1. The vertical axis indicates the image focal distance, that is, a distance to a position where an image as a virtual image is recognized to be present with respect to the adjustment amount.

In this case, it can be seen that if an adjustment range of about 0.5 mm is provided, the image focal distance can be adjusted in a range near 2500 mm. As described above, since the projection lens PO includes the lens (second lens PO2) movable in the light ray traveling direction, it is possible to adjust the image focal distance.

Also in the exemplary embodiment, since the first mirror 331 has an angular dependence, it is possible to maintain appropriate reflection for the image light ML and to avoid or suppress generation of ghost light, etc. due to reflection of an unintended component from the outside. Further, in the present exemplary embodiment, the optical system can be configured as a rotationally symmetric optical system.

Third Exemplary Embodiment

Hereinafter, a virtual image display device as the virtual image display device according to the third exemplary embodiment will be described with reference to FIG. 16, etc. In addition, a virtual image display device as an example of the virtual image display device according to the present exemplary embodiment is obtained by partially changing the virtual image display device 200 according to the first exemplary embodiment, and a configuration except that the first mirror 31 and the third mirror 33 are integrated is similar to that in the case of the first exemplary embodiment, so that detailed illustration and description of the entire configuration, etc. are omitted, and matters described with reference to other drawings are appropriately incorporated as necessary.

Figure 16:
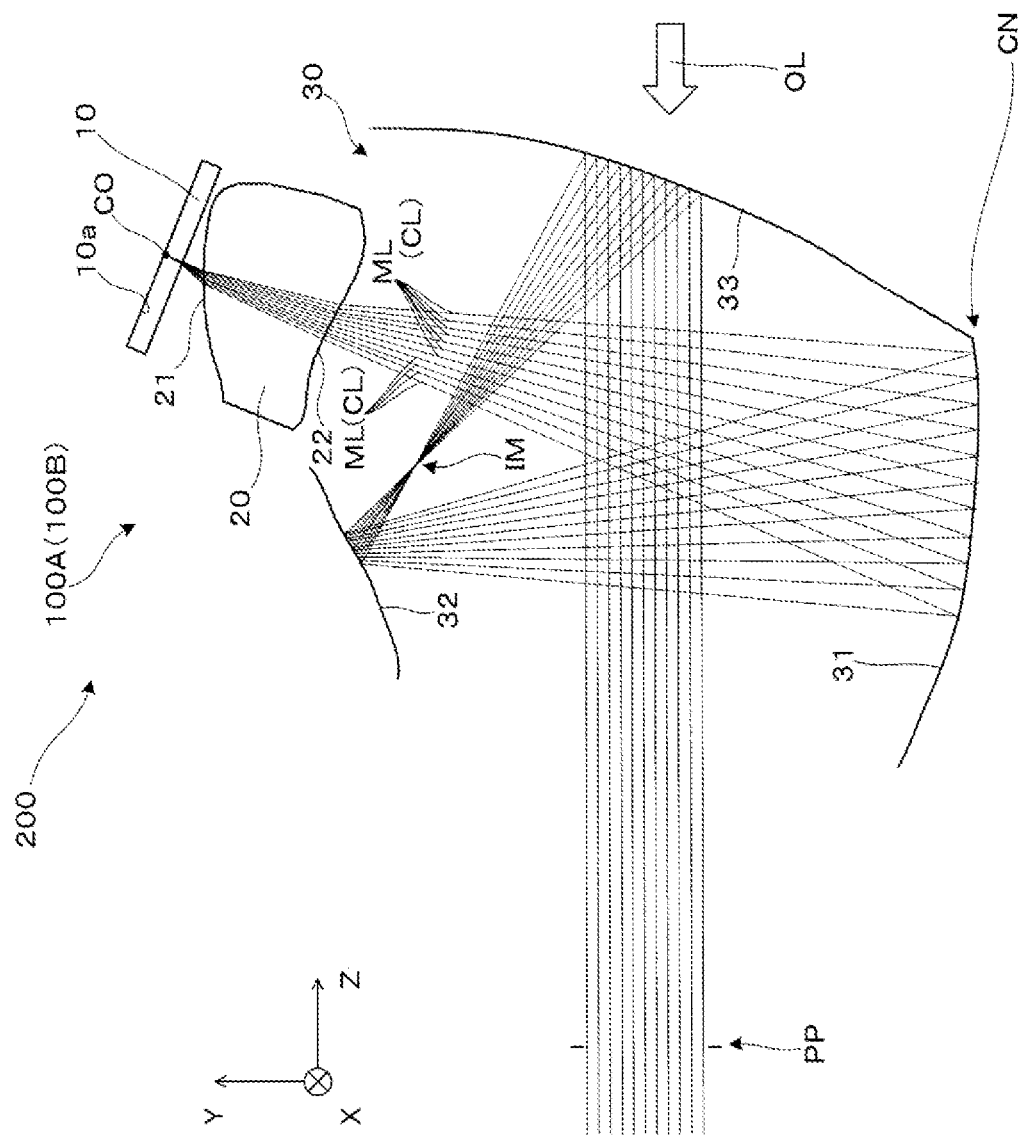
FIG. 16 is a side cross-sectional view schematically illustrating a virtual image display device according to a third exemplary embodiment.

FIG. 16 is a side cross-sectional view schematically illustrating the virtual image display device 200 according to the present exemplary embodiment, and corresponds to FIG. 2. In other words, in FIG. 16, a central light flux (central component CL) of the image light ML emitted from the display element 10 is illustrated. In this case, since the first mirror 31 and the third mirror 33 are integrated, it is easy to maintain assembly accuracy, and it is possible to reduce the number of optical components. In addition, it is possible to inhibit dust, etc. from entering from the gap between the first mirror 31 and the third mirror 33.

By providing a coupling portion CN between the first mirror 31 and the third mirror 33 as a portion through which the image light ML does not pass, it is possible to prevent the coupling portion CN from affecting the light guide of the image light ML.

Figure 17:
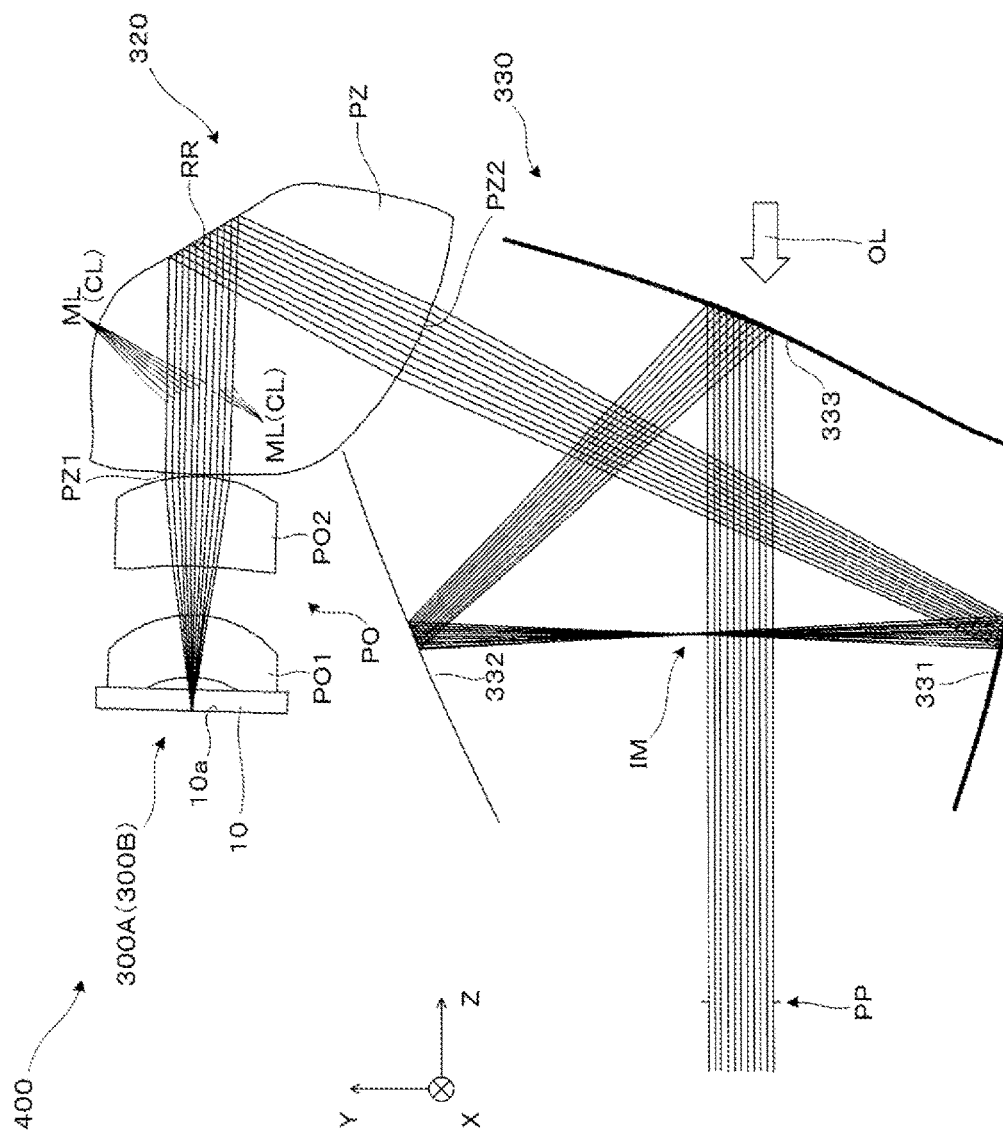
FIG. 17 is a side cross-sectional view schematically illustrating a virtual image display device according to a modification example.

FIG. 17 is a side cross-sectional view schematically illustrating the virtual image display device 400 according to a modification example of the exemplary embodiment, and corresponds to FIG. 9. That is, in FIG. 17, since the first mirror 331 and the third mirror 333 are integrated, it is easy to maintain assembly accuracy, and it is possible to reduce the number of optical components. In addition, it is possible to inhibit dust, etc. from entering from the gap between the first mirror 331 and the third mirror 333.

Also in the exemplary embodiment, it is possible to maintain appropriate reflection for the image light ML and to avoid or suppress generation of ghost light, etc. due to reflection of an unintended component from the outside. Further, in the present exemplary embodiment, it is possible to simplify the maintenance of the assembly accuracy.

MODIFICATION EXAMPLES AND OTHERS

The present disclosure is described according to the above-described exemplary embodiments, but the present disclosure is not limited to the above-described exemplary embodiments. The present disclosure may be carried out in various modes without departing from the gist of the present disclosure, and, for example, the following modifications may be carried out.

First, in the above description, a configuration in which an intermediate image is provided at one place on the optical path is exemplified, but the present disclosure is not limited thereto, and a system in which intermediate images are formed at a plurality of places (two places) may be configured.

In addition, in the above description, the housing CS can have various aspects within a range in which the optical function is not impaired, and for example, as described above, in addition to a configuration in which a member for installation for fixing each optical system at a predetermined position is provided, a configuration having a dust-proof function may be adopted.

Although the virtual image display device 200 for both eyes is described above, one of the portions for the right eye and the left eye may be omitted from the virtual image display device 200. That is, the optical system of the virtual image display device 200 can be formed only by the first display device 100A for the right eye and the second display device 100B for the left eye, and in this case, a single-eye type head-mounted display is obtained.

The virtual image display device according to a specific aspect includes an image light generating unit configured to generate image light, a first mirror configured to reflect the image light, a second mirror configured to reflect the image light reflected by the first mirror, and a third mirror configured to transmit external light and reflect, toward a position of an exit pupil, part of the image light reflected by the second mirror, wherein the first mirror has an angular dependence such that a reflectance varies depending on an angle of incidence of the image light.

In the virtual image display device, the external light is transmitted through the third mirror and part of the image light reflected by the second mirror is reflected toward the position of the exit pupil, so that so-called see-through visual recognition is possible. On the other hand, since the first mirror has the angular dependence in which the reflectance varies depending on the angle at which the image light is incident, it is possible to maintain appropriate reflection for the image light and to avoid or suppress generation of ghost light, etc. due to reflection of an unintended component from the outside.

In a specific aspect, in the first mirror, a reflectance of the image light incident at an angle of 45° or less is higher than a reflectance of the image light incident at an angle greater than 45°. In this case, even when the image light has a wide angle of view, it is possible to avoid or inhibit unintended light from being directed toward the wearer while maintaining high reflectivity.

In a specific aspect, the third mirror is configured to reflect part of the image light to pass between the first mirror and the second mirror. In this case, the optical system can be made compact.

In a specific aspect, the first mirror is located below the image light generating unit with respect to a position of the exit pupil, and the first mirror is configured to reflect the image light to the second mirror located above the exit pupil. In this case, while the light source is disposed at a position where the device is difficult to interfere with the wearer during installation, the optical path can be bent, and the optical system can be configured as a compact configuration while ensuring the optical path of the optical system.

In a specific aspect, the third mirror has an angle-dependent reflectance such that a reflectance with respect to light incident at an angle greater than 45° is higher than a reflectance with respect to light incident at an angle of 45° or less. In this case, it is possible to avoid or suppress unintended light from traveling toward the wearer.

In a specific aspect, the third mirror is a polarizing mirror configured to reflect the image light in a specific polarization state. In this case, image light can be used in high efficiency.

In a specific aspect, the image light generating unit is configured to emit the image light in the polarization state. In this case, the image light generating unit and the third mirror cooperate so that image light can be used in high efficiency.

A specific aspect includes a polarizing plate provided at an optical path from the image light generating unit to the first mirror, and configured to bring the image light emitted from the image light generating unit into the polarization state. In this case, the polarizing plate and the third mirror cooperate so that image light can be used in high efficiency.

A specific aspect includes an optical member provided at an optical path from the image light generating unit to the first mirror, and configured to emit, toward the first mirror, the image light from the image light generating unit.

In a specific aspect, the optical member includes a first optical member configured to emit the image light toward the first mirror, and the first optical member includes an incident portion on which the image light is incident, a reflecting portion configured to reflect the image light incident from the incident portion, and an emitting portion configured to emit, portion toward, the image light reflected by the reflecting the first mirror. In this case, the optical member located on the light source side can be a strong configuration of the power of the entire optical system.

In a specific aspect, the first optical member includes a diaphragm at the emitting portion, the diaphragm being configured to shield part of the image light reflected by the reflecting portion. In this case, light can be shielded at or near the pupil (entrance pupil).

In a specific aspect, the optical member includes a second optical member configured to emit, toward the incident portion of the first optical member, the image light emitted from the image light generating unit. In this case, the second optical member can have a strong configuration of the power of the entire optical system.

In a specific aspect, the first mirror, the second mirror, the third mirror, the first optical member, and the second optical member form a rotationally symmetric optical system. In this case, each optical system can be easily fabricated.

In a specific aspect, the second optical member is configured to move in an optical path between the image light generating unit and the first optical member. In this case, the image focal distance can be adjusted.

In a specific aspect, the optical member is configured to project, toward the first mirror, the image light to intersect with an optical path of the image light reflected by the second mirror toward the third mirror and an optical path of the image light reflected by the third mirror toward the position of the exit pupil. In this case, it is possible to bend the optical path of the image light a plurality of times and to make the optical system more compact while securing the optical path of the optical system.

In a specific aspect, the first mirror and the third mirror are integrated. In this case, it is possible to simplify the maintenance of the assembly accuracy.

What is claimed is:

1. A virtual image display device comprising:
an image light generating unit that generates an image light;
a first mirror that reflects the image light;
a second mirror that reflects the image light reflected by the first mirror; and
a third mirror that transmits an external light
and that reflects, toward a position of an exit pupil, part of the image light reflected by the second mirror, wherein
the first mirror has a reflective film reflecting the image light, and a light absorption film being provided on a surface opposite to a surface with the reflective film,
the reflective film of the first mirror has an angular dependence such that a reflectance of the first mirror varies depending on an angle of incidence of the image light reaching the first mirror from the light generator unit,
the third mirror has an angle-dependent reflectance such that a reflectance with respect to light incident at an angle greater than 45° is higher than a reflectance with respect to light incident at an angle of 45° or less, and
the light absorption film of the first mirror absorbs the external light passed thought the third mirror.

2. The virtual image display device according to claim 1, wherein
in the first mirror, a reflectance of the image light incident at an angle of 45° or less is higher than a reflectance of the image light incident at an angle greater than 45°.

3. The virtual image display device according to claim 1, wherein
the third mirror reflects part of the image light to pass between the first mirror and the second mirror.

4. The virtual image display device according to claim 1, wherein
the first mirror is located below the image light generating unit with respect to a position of the exit pupil, and the first mirror reflects the image light to the second mirror located above the exit pupil.

5. The virtual image display device according to claim 1, wherein
the third mirror is a polarizing mirror that reflects the image light in a specific polarization state.

6. The virtual image display device according to claim 5, wherein
the image light generating unit emits the image light in the polarization state.

7. The virtual image display device according to claim 5, comprising a polarizing plate provided at an optical path from the image light generating unit to the first mirror, and bring the image light emitted from the image light generating unit into the polarization state.

8. The virtual image display device according to claim 1, comprising an optical member that is provided at an optical path from the image light generating unit to the first mirror, and that emits the image light from the image light generating unit toward the first mirror.

9. The virtual image display device according to claim 8, wherein
the optical member includes a first optical member that emits the image light toward the first mirror, and
the first optical member includes an incident portion on which the image light is incident, a reflecting portion that reflects the image light incident from the incident portion, and an emitting portion that emits, toward the first mirror, the image light reflected by the reflecting portion.

10. The virtual image display device according to claim 9, wherein
the first optical member includes a diaphragm at the emitting portion, the diaphragm that shields part of the image light reflected by the reflecting portion.

11. The virtual image display device according to claim 9, wherein
the optical member includes a second optical member that emits, toward the incident portion of the first optical member, the image light emitted from the image light generating unit.

12. The virtual image display device according to claim 11, wherein
the first mirror, the second mirror, the third mirror, the first optical member, and the second optical member form a rotationally symmetric optical system.

13. The virtual image display device according to claim 12, wherein
the second optical member moves in an optical path between the image light generating unit and the first optical member.

14. The virtual image display device according to claim 8, wherein
the optical member projects, toward the first mirror, the image light to intersect with an optical path of the image light reflected by the second mirror toward the third mirror and an optical path of the image light reflected by the third mirror toward the position of the exit pupil.

15. The virtual image display device according to claim 1, comprising a coupling portion that couples the first mirror and the third mirror.

* * * * *